United States Patent
Jain et al.

(10) Patent No.: US 12,374,010 B2
(45) Date of Patent: Jul. 29, 2025

(54) MODIFYING DIGITAL IMAGES FOR EQUIDISTANT SPACING OF OBJECTS ACROSS MULTIPLE PERSPECTIVES

(71) Applicant: Adobe Inc., San Jose, CA (US)

(72) Inventors: Ashish Jain, Delhi (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 183 days.

(21) Appl. No.: 18/470,295

(22) Filed: Sep. 19, 2023

(65) Prior Publication Data
US 2025/0095247 A1    Mar. 20, 2025

(51) Int. Cl.
*G06T 11/60* (2006.01)
*G06F 3/04845* (2022.01)
*G06V 10/74* (2022.01)

(52) U.S. Cl.
CPC .......... *G06T 11/60* (2013.01); *G06F 3/04845* (2013.01); *G06V 10/761* (2022.01)

(58) Field of Classification Search
None
See application file for complete search history.

(56) References Cited

U.S. PATENT DOCUMENTS

2017/0221236 A1 *  8/2017  Dowd ................. G06F 3/04847

OTHER PUBLICATIONS

"Create and Edit Perspective Grid." Adobe, website <https://helpx.adobe.com/illustrator/using/perspective-drawing.html>, Jul. 10, 2023.

* cited by examiner

*Primary Examiner* — Nicholas R Wilson
(74) *Attorney, Agent, or Firm* — Keller Preece PLLC

(57) ABSTRACT

The present disclosure relates to systems, methods, and non-transitory computer readable media that position objects across multiple perspectives within digital images to be equidistant. For instance, in some embodiments, the disclosed systems detect a user interaction for moving a first object within a first perspective of a digital image. Additionally, the disclosed systems extract a first distance between the first object within the first perspective and a joining edge between the first perspective and a second perspective of the digital image. The disclosed systems also extract a second distance between a second object within the second perspective of the digital image and the joining edge. Based on the first distance and the second distance, the disclosed systems modify the digital image by positioning the first object within the first perspective to be equidistant to the joining edge relative to the second object within the second perspective.

20 Claims, 14 Drawing Sheets

MODIFYING DIGITAL IMAGES FOR EQUIDISTANT SPACING OF OBJECTS ACROSS MULTIPLE PERSPECTIVES

BACKGROUND

Recent years have seen significant advancement in hardware and software platforms for editing digital images. Indeed, as the use of digital images has become increasingly ubiquitous, systems have developed to facilitate the manipulation of the content within such digital images. For instance, in the field of digital image editing, computer-implemented tools or algorithms can be implemented to manipulate objects in accordance with a perspective portrayed within a digital image. Despite these advancements, several technical problems exist with respect to positioning objects within a digital image based on a perspective. Specifically, digital image editing approaches often fail to facilitate the placing of objects portrayed in different perspectives of a digital image, leading to unrealistic results.

SUMMARY

One or more embodiments described herein provide benefits and/or solve one or more of the foregoing or other problems in the art with systems, methods, and non-transitory computer-readable media that implement object-based spacing for modifying digital images to evenly space objects that are portrayed within different perspectives. In particular, in one or more embodiments, the disclosed systems generate and provide perspective-aware guides and/or snapping across different perspectives portrayed in a digital image based on the spacing of at least one object from an edge where the perspective planes meet. To illustrate, in some implementations, the disclosed systems extract snappable segments from the perspective bounding boxes of objects portrayed across different perspectives of a digital image. The disclosed systems further sort the extracted snappable segments based on their positioning within their respective perspectives, including their distance from the edge between the perspectives. Using this sorting, the disclosed systems determine a distance for an object being moved in one perspective from the edge based on the distance of another object within another perspective. In this manner, the disclosed systems flexibly space the moving object to be equidistant to the edge with respect to the other object to provide the digital image with an even, natural appearance.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
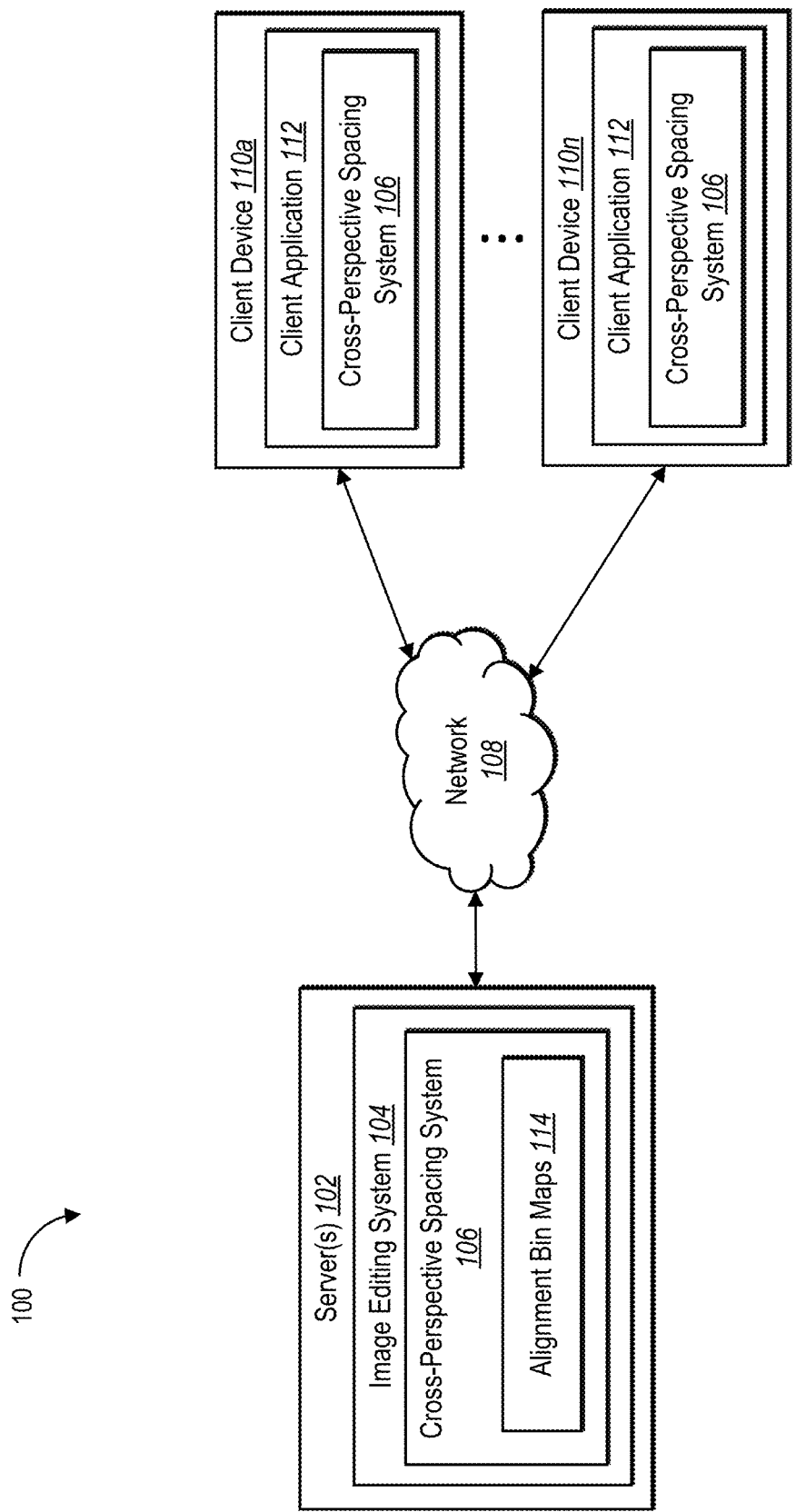
FIG. 1 illustrates an example environment in which a cross-perspective spacing system operates in accordance with one or more embodiments.

One or more embodiments described herein include a cross-perspective spacing system that modifies a digital image, so an object moved within one perspective is equidistant to an edge between perspectives relative to another object portrayed in another perspective. For instance, in one or more embodiments, the cross-perspective spacing system extracts snappable line segments from the objects of a digital image and generates an alignment bin map for each perspective portrayed therein. The cross-perspective spacing system further sorts the snappable line segments of each object within the alignment bin map that corresponds to its perspective. For example, in some instances, the cross-perspective spacing system sorts the snappable line segments based on an angle made with respect to a first reference line and/or a distance between the snappable line segment and a second reference line, such as an edge that separates the perspectives. When an object is moved within a perspective, the cross-perspective spacing system utilizes the sorting within the alignment bin maps to determine a spacing from the edge between the perspectives that makes the object equidistant with another object in the other perspective. In some cases, the cross-perspective spacing system recommends and/or snaps the object to a position with the spacing.

To illustrate, in one or more embodiments, the cross-perspective spacing system detects one or more user interactions for moving a first object within a first perspective of a digital image. The cross-perspective spacing system extracts a first distance between the first object within the first perspective of the digital image and a joining edge between the first perspective and a second perspective of the digital image. Further, the cross-perspective spacing system extracts a second distance between a second object within a second perspective of the digital image and the joining edge. Based on the first distance and the second distance, the cross-perspective spacing system modifies the digital image by positioning the first object within the first perspective to be equidistant to the joining edge relative to the second object within the second perspective.

As just indicated, in one or more embodiments, the cross-perspective spacing system spaces objects in multiple perspectives so they are equidistant to some reference, such as an edge between perspective planes. Indeed, in some embodiments, the cross-perspective spacing system operates on digital images portraying multiple perspectives. In many cases, the planes of the perspectives form an edge where they meet-a joining edge. Thus, in some instances, the cross-perspective spacing system positions one object within one perspective so that it is the same distance from the joining edge as another object located in another perspective.

Indeed, in some implementations, the cross-perspective spacing system implements object-based spacing. In particular, the cross-perspective spacing system determines at which distance from the joining edge to position a first object in a first perspective based on the distance from the joining edge of a second object in a second perspective. Thus, in some cases, the cross-perspective spacing system determines the distance between the second object and the joining edge and positions the first object in the first perspective to match that distance.

As further mentioned, in one or more embodiments, the cross-perspective spacing system utilizes alignment bin maps to position objects in different perspectives, so the objects are equidistant to a joining edge. For instance, in some cases, the cross-perspective spacing system utilizes the alignment bin maps to select an object from the second perspective upon which to base the spacing of the first object in the first perspective.

To illustrate, in some embodiments, the cross-perspective spacing system generates an alignment bin map for each perspective of a digital image, where each alignment bin map includes a plurality of alignment bins that divide the perspective. The cross-perspective spacing system further sorts the objects portrayed in each perspective (e.g., the snappable line segments of each object) within the corresponding alignment bin map. For instance, in some cases, the cross-perspective spacing system sorts the objects into the alignment bins based on the angle they make with respect to a reference line. In some implementations, the cross-perspective spacing system further sorts objects within the same alignment bin based on their distance from the joining edge.

As such, in some embodiments, when a first object is moved within a first perspective, the cross-perspective spacing system determines a position of the first object within the alignment bin map for the first perspective. The cross-perspective spacing system further selects a second object from the second perspective based on the previous sorting of objects within the alignment bin map for the second perspective. For instance, in some cases, the cross-perspective spacing system identifies one or more alignment bins for the second perspective that correspond to the alignment bin associated with the first object in the first perspective and selects an object from those one or more alignment bins based on their prior sorting. In some instances, the cross-perspective spacing system selects the object based on its distance to the joining edge and positions the first object within the first perspective based on that distance.

In one or more embodiments, the cross-perspective spacing system spaces objects based on perspective-based distance. Indeed, in some cases, rather than positioning an object based on a pixel distance to the joining edge between perspectives, the cross-perspective spacing system spaces an object based on its distance relative to its corresponding perspective. Thus, in some embodiments, the cross-perspective spacing system operates on a digital image portraying different perspectives asymmetrically and positions the objects portrayed therein so they are equidistant to a joining edge relative to their different perspectives.

In some embodiments, upon selecting an object within the second perspective for positioning the first object in the first perspective, the cross-perspective spacing system provides a recommendation for the positioning of the first object. For example, in some cases, the cross-perspective spacing system generates and provides a perspective guide for display within a graphical user interface of a client device displaying the digital image to indicate the positioning. In some implementations, the cross-perspective spacing system snaps (e.g., moves) the first object to a location within the first perspective that causes the first object to be equidistant to the joining edge relative to the object in the second perspective.

As mentioned above, conventional perspective-based object positioning systems suffer from several technological shortcomings that result in inflexible, inaccurate, and inefficient operation. For instance, conventional systems are inflexible in that they often fail to facilitate the equal spacing of objects across different perspectives. To illustrate, conventional systems often restrict the positioning of an object within a perspective based on a grid created for that perspective. Indeed, many conventional systems generate a grid having grid lines that follow the perspective of a digital image. Such systems, however, often require that an object moved within that perspective align with the grid lines. For example, such systems typically prevent an object from being moved within its perspective so that its borders (or the borders of its bounding box) fall between grid lines and may force the object to the grid lines via a snapping operation. Where a digital image portrays multiple perspectives, limiting object positioning to the grid lines often prevents an object from being moved within one perspective to have equal spacing with respect to another object within another perspective, particularly where the borders of the other object inherently fall between the grid lines when the grid for its perspective is created. In many instances, these systems require adjusting the dimensions of a moved object to achieve some degree of alignment to the grid.

Further, conventional perspective-based object positioning systems often fail to operate accurately. In particular, conventional systems typically fail to accurately space objects across different perspectives of a digital image, leading to unrealistic image results. For instance, by requiring positioning of a moved object in accordance with grid lines, conventional systems often fail to accurately space objects across different perspectives so that they are equally distant from a reference (e.g., the joining edge between perspectives). In many instances, the realism of a digital image portraying multiple perspectives relies at least partially on the equal spacing of object across its perspectives. Thus, failing to equally space objects across perspectives results in a digital image having an unnatural perspective appearance. Rather than using the perspective-based grids, some conventional systems enable free movement of an object within a perspective of a digital image. Such systems, however, are imprecise and subject to user error, resulting in similar inaccuracies as the grid approach.

In addition to problems of inflexibility and inaccuracy, conventional perspective-based object positioning systems also experience problems of inefficiency. For instance, conventional systems that utilize perspective-based grids are often inefficient as they must maintain and search through a large pool of grid lines to find a grid line appropriate for a moving object. Thus, these systems typically consume a significant amount of computing resources (e.g., memory or processing power) to facilitate movement of objects within a perspective.

The cross-perspective spacing system provides several advantages over conventional systems. For example, the cross-perspective spacing system improves the flexibility of implementing computing devices when compared to conventional systems by spacing objects across different perspectives of a digital image to be equidistant from a reference (e.g., a joining edge between perspectives). Indeed, by determining a distance for an object from a reference within one perspective based on the distance of another object from the reference within another perspective, the cross-perspective spacing system flexibly positions the object to be equidistant to the reference relative to the other object. Further, by using alignment bin maps to sort and search for objects to use in positioning other objects, the cross-perspective spacing system offers a grid-free approach to equally spacing objects across perspectives and facilitates positioning objects without the need to adjust the dimensions of an object.

Additionally, the cross-perspective spacing system improves the accuracy of implementing computing devices when compared to conventional systems. Indeed, while conventional systems position objects based on grid lines generated for a perspective or based on manual user movement, the cross-perspective spacing system offers an intelligent and automated approach to object positioning by using the position of one object in one perspective to position another object in another perspective. Thus, the cross-perspective spacing system avoids the limited placement options associated with perspective-based grids and the imprecision of user input. Accordingly, the cross-perspective spacing system implements an approach to object positioning that facilitates the equal spacing of objects across different perspectives, leading to a more natural perspective appearance within digital images.

Further, the cross-perspective spacing system improves the efficiency of implementing computing devices when compared to conventional systems. Indeed, by determining a position for an object using alignment bin maps generated for a digital image, the cross-perspective spacing system implements a more efficient positioning approach. In particular, alignment bin maps offer a smaller search pool when compared to the perspective-based grids of conventional systems, allowing the cross-perspective spacing system to more quickly determine how to position an object for spacing it from a reference, reducing the computing resources consumed in the process.

Additional details regarding the cross-perspective spacing system will now be provided with reference to the figures. For example, FIG. 1 illustrates a schematic diagram of an exemplary system environment ("environment") 100 in which a cross-perspective spacing system 106 operates. As illustrated in FIG. 1, the environment 100 includes a server(s) 102, a network 108, and client devices 110a-110n.

Although the environment 100 of FIG. 1 is depicted as having a particular number of components, the environment 100 is capable of having any number of additional or alternative components (e.g., any number of servers, client devices, or other components in communication with the cross-perspective spacing system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 10). Moreover, the server(s) 102 and the client devices 110a-110n include one of a variety of computing devices (including one or more computing devices as discussed in greater detail with relation to FIG. 10).

As mentioned above, the environment 100 includes the server(s) 102. In one or more embodiments, the server(s) 102 generates, stores, receives, and/or transmits data including digital images and/or modified digital images. In one or more embodiments, the server(s) 102 comprises a data server. In some implementations, the server(s) 102 comprises a communication server or a web-hosting server.

In one or more embodiments, the image editing system 104 provides functionality by which a client device (e.g., a user of one of the client devices 110a-110n) generates, edits, manages, and/or stores digital images. For example, in some instances, a client device sends a digital image to the image editing system 104 hosted on the server(s) 102 via the network 108. The image editing system 104 then provides many options that the client device may use to edit the digital image, store the digital image, and subsequently search for, access, and view the digital image. For instance, in some cases, the image editing system 104 provides one or more options that the client device may use to space objects across different perspectives portrayed within a digital image equally from a reference.

Additionally, the server(s) 102 includes the cross-perspective spacing system 106. In one or more embodiments, via the server(s) 102, the cross-perspective spacing system 106 modifies digital images to space objects across different perspectives equally from a reference. For instance, in some cases, the cross-perspective spacing system 106, via the server(s) 102, generates alignment bin maps 114 for the perspectives of a digital image, associates each object portrayed in the digital image with a corresponding alignment bin map, determines a distance from a reference for an object of one perspective based on the distance from the reference of another object of another perspective using the alignment bin maps 114, and modifies the digital image by positioning the object in accordance with the determined distance. Example components of the cross-perspective spacing system 106 will be described below with regard to FIG. 8.

In one or more embodiments, the client devices 110a-110n include computing devices that can access, edit, implement, modify, store, and/or provide, for display, digital images. For example, the client devices 110a-110n include smartphones, tablets, desktop computers, laptop computers, head-mounted-display devices, or other electronic devices. The client devices 110a-110n include one or more applications (e.g., the client application 112) that can access, edit, implement, modify, store, and/or provide, for display, digital images. For example, in some embodiments, the client application 112 includes a software application installed on the client devices 110a-110n. In other cases, however, the client application 112 includes a web browser or other application that accesses a software application hosted on the server(s) 102.

The cross-perspective spacing system 106 can be implemented in whole, or in part, by the individual elements of the environment 100. Indeed, as shown in FIG. 1 the cross-perspective spacing system 106 can be implemented with regard to the server(s) 102 and/or at the client devices 110a-110n. In particular embodiments, the cross-perspective spacing system 106 on the client devices 110a-110n comprises a web application, a native application installed on the client devices 110a-110n (e.g., a mobile application, a desktop application, a plug-in application, etc.), or a cloud-based application where part of the functionality is performed by the server(s) 102.

In additional or alternative embodiments, the cross-perspective spacing system 106 on the client devices 110a-110n represents and/or provides the same or similar functionality as described herein in connection with the cross-perspective spacing system 106 on the server(s) 102. In some implementations, the cross-perspective spacing system 106 on the server(s) 102 supports the cross-perspective spacing system 106 on the client devices 110a-110n.

In some embodiments, the cross-perspective spacing system 106 includes a web hosting application that allows the client devices 110a-110n to interact with content and services hosted on the server(s) 102. To illustrate, in one or more implementations, the client devices 110a-110n accesses a web page or computing application supported by the server(s) 102. The client devices 110a-110n provide input to the server(s) 102, such as a digital image and/or input for moving an object within a perspective of the digital image. In response, the cross-perspective spacing system 106 on the server(s) 102 utilizes the provided input to generate a recommendation for a location of the object that causes the object to be equidistant to a reference relative to another object portrayed within another perspective. The server(s) 102 then provides the recommendation (e.g., a perspective guide or snapped location) to the client devices 110a-110n.

In some embodiments, though not illustrated in FIG. 1, the environment 100 has a different arrangement of components and/or has a different number or set of components altogether. For example, in certain embodiments, the client devices 110a-110n communicate directly with the server(s) 102 bypassing the network 108. As another example, the environment 100 includes a third-party server comprising a content server and/or a data collection server.

Figure 2:
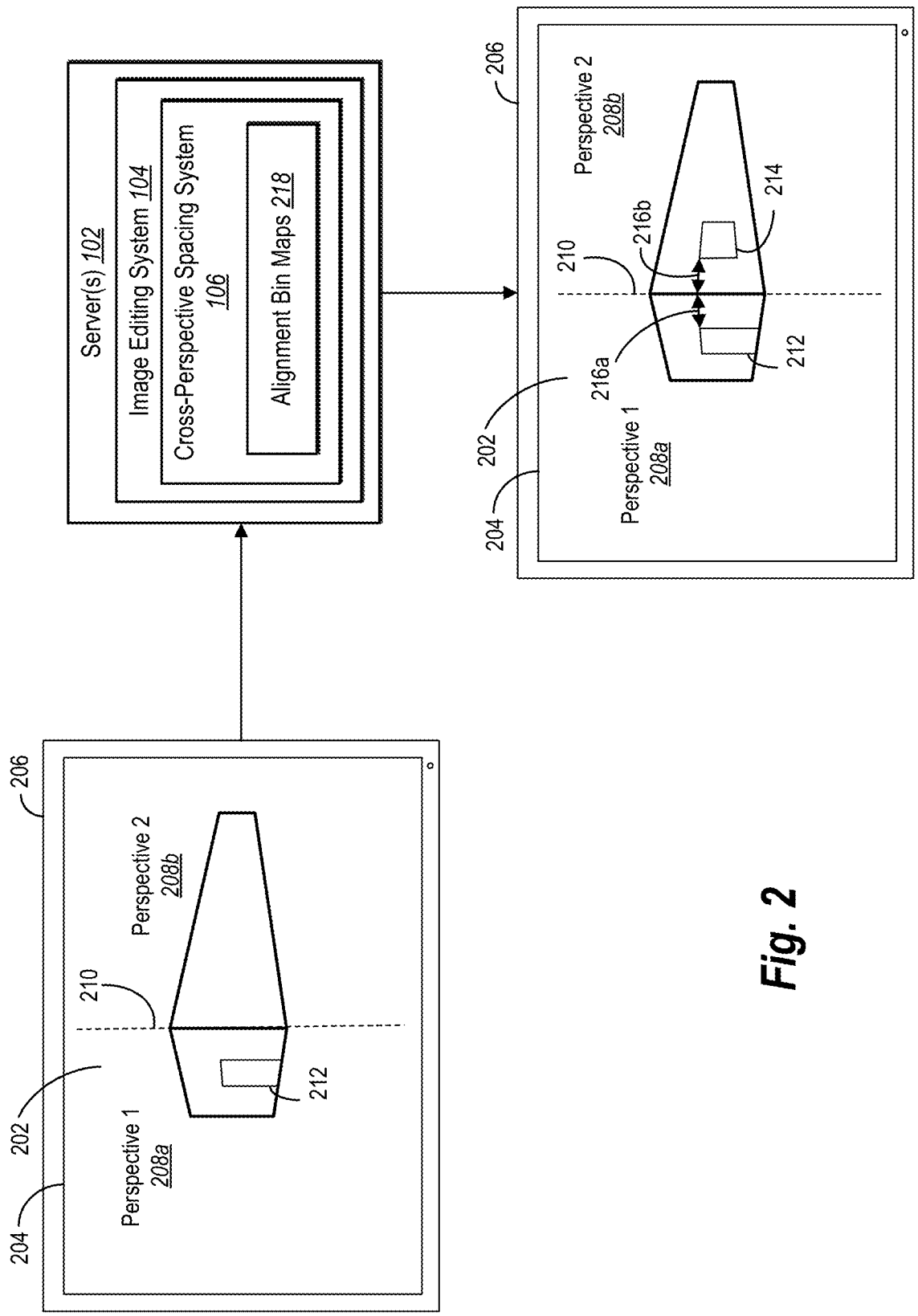
FIG. 2 illustrates an overview diagram of the cross-perspective spacing system positioning objects across different perspectives to be equidistant in accordance with one or more embodiments.

As mentioned in one or more embodiments, the cross-perspective spacing system 106 positions objects across different perspectives portrayed within a digital image to be equidistant from a reference. FIG. 2 illustrates an overview diagram of the cross-perspective spacing system 106 spacing objects across different perspectives in accordance with one or more embodiments.

Indeed, as shown in FIG. 2, the cross-perspective spacing system 106 provides a digital image 202 for display within a graphical user interface 204 of a client device 206. As illustrated, the digital image 202 portrays a first perspective 208a and a second perspective 208b. A joining edge 210 is located between the first perspective 208a and the second perspective 208b.

In one or more embodiments, a joining edge includes a location within a digital image where at least two perspective planes meet. In particular, in some embodiments, a joining edge includes a location within a digital image between at least two perspectives. Thus, in some cases, a joining edge represents a transition from one perspective to another within a digital image.

Additionally, as shown in FIG. 2, the digital image 202 portrays a first object 212 within the first perspective 208a. In particular, the digital image 202 portrays the first object 212 in accordance with the first perspective 208a in that the digital image 202 portrays the horizontal line of the first object 212 as following the first perspective 208a (e.g., the horizontal line segments exhibit a trajectory towards a vanishing point associated with the first perspective 208a). The digital image 202 further portrays the first object 212 at a particular distance from the joining edge 210 between the first perspective 208a and the second perspective 208b.

As shown in FIG. 2, the cross-perspective spacing system 106 modifies the digital image 202 by positioning a second object 214 within the second perspective 208b. In some cases, the second object 214 includes a new object that has been added to the digital image 202. In some implementations, the second object 214 includes an object that was previously portrayed within the digital image 202 (e.g., previously portrayed within the second perspective 208b) but at a different location.

In particular, as shown in FIG. 2, the cross-perspective spacing system 106 positions the second object 214 in the second perspective 208b to be equidistant to the joining edge 210 relative to the first object 212 in the first perspective 208a. In other words, the cross-perspective spacing system 106 positions the second object 214 so that the distance (represented by the arrow 216b) between the second object 214 and the joining edge 210 is equal to the distance (represented by the arrow 216a) between the first object 212 and the joining edge 210). Indeed, as will be described in more detail below, in one or more embodiments, the cross-perspective spacing system 106 uses the joining edge 210 as a reference upon which to base the spacing of objects within their respective perspectives (though various references are used in various embodiments). When positioning the second object 214 within the second perspective 208b, the cross-perspective spacing system 106 uses the distance between the first object 212 and the joining edge 210 to determine the distance from the joining edge 210 for the second object 214. In particular, the cross-perspective spacing system 106 uses the distance between the first object 212 and the joining edge 210 as the distance for the second object 214 from the joining edge 210 and positions the second object 214 within the second perspective 208b to be at that distance. Thus, the cross-perspective spacing system 106 causes the first object 212 and the second object 214 to be equidistant from the joining edge 210.

In one or more embodiments, equidistance generally includes the equal spacing of two points from a reference. In other words, the two points are equidistant with respect to the reference if they are both the same distance from the reference. In some embodiments, in the context of a digital image, equidistance includes the equal spacing of two locations within the digital image from a reference, such as a joining edge between a first perspective and a second perspective of the digital image. Thus, as discussed above and as indicated by FIG. 2, to position an object within a digital image to be equidistant to a reference relative to another object includes positioning the object within the digital image to have the same distance from the reference as the other object.

In some embodiments, the cross-perspective spacing system 106 determines equidistance within a digital image using pixel-based distances. For instance, in some cases, the cross-perspective spacing system 106 determines that two locations within a digital image (e.g., two locations containing an object) are equidistant from a reference if the same number of pixels span the distance between the reference and each object. In some implementations, however, the cross-perspective spacing system 106 determines equidistance within a digital image using perspective-based distances. For example, in some instances, the cross-perspective spacing system 106 determines that two locations within a digital image are equidistant from a reference if their distances from the reference relative to their perspectives are equal. Thus, in scenarios where the digital image portrays multiple perspectives, the cross-perspective spacing system 106 can determine that objects across the perspectives are equidistant to a reference (e.g., the joining edge between perspectives) even where a different number of pixels spans the distance between the reference and each object. Using perspective-based distances will be described more below.

As shown in FIG. 2, the cross-perspective spacing system 106 utilizes alignment bin maps 218 in positioning the second object 214 to be equidistant with the first object 212. In one or more embodiments, an alignment bin map includes a mapping of a portion of a digital image for use in positioning objects within the digital image. In particular, in some embodiments, an alignment bin map includes a mapping of a perspective of a digital image for use in positioning an object within that perspective to be equidistant with another object of another perspective. To illustrate, in some cases, an alignment bin map divides a perspective of a digital image (e.g., the portion of the digital image portrayed in that perspective) into multiple alignment bins.

In one or more embodiments, an alignment bin includes a portion of an alignment bin map. Further, in some embodiments, an alignment bin is associated with one or more indices within an alignment bin map. In some implementations, an alignment bin corresponds to an angle or range of angles with respect to a reference line. Indeed, as will be described in more detail below, in some cases, an alignment bin corresponds to a segment of a digital image associated with a perspective portrayed therein that falls within an angle or range of angles with respect to a reference line for that perspective.

In one or more embodiments, the cross-perspective spacing system 106 generates the alignment bin maps 218 for the digital image 202. For instance, in some embodiments, the cross-perspective spacing system 106 generates the alignment bin maps 218 by generating a first alignment bin map for the first perspective 208a and a second alignment bin map for the second perspective 208b.

Figure 3:
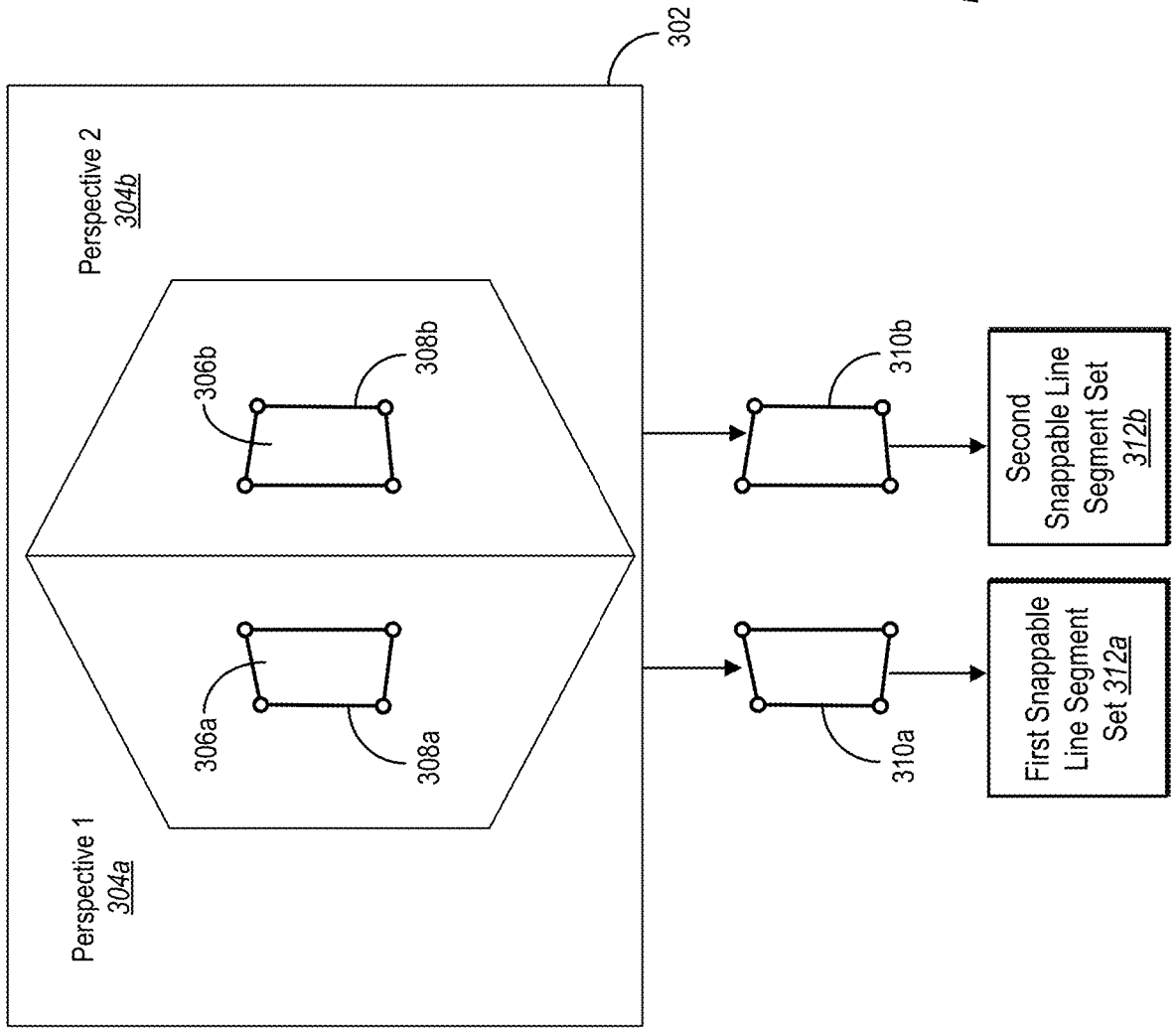
FIG. 3 illustrates the cross-perspective spacing system extracting snappable line segments from objects portrayed in a digital image in accordance with one or more embodiments.

As previously mentioned, in one or more embodiments, the cross-perspective spacing system 106 extracts snappable line segments from objects portrayed within perspectives of a digital image. FIG. 3 illustrates the cross-perspective spacing system 106 extracting snappable line segments from objects portrayed in a digital image in accordance with one or more embodiments.

As shown in FIG. 3, the cross-perspective spacing system 106 analyzes a digital image 302 portraying a first perspective 304a and a second perspective 304b. Additionally, as shown, the digital image 302 portrays a first object 306a within the first perspective 304a and a second object 306b within the second perspective 304b.

As further shown, the first object 306a is associated with a first perspective bounding box 308a, and the second object 306b is associated with a second perspective bounding box 308b. In one or more embodiments, a perspective bounding box includes a bounding box for an object that follows a perspective within which the object is portrayed. In particular, in some embodiments, a perspective bounding box includes a bounding box having at least one boundary (e.g., at least one line segment) that follows the corresponding perspective. To illustrate, in some implementations, a perspective bounding box includes a bounding box having at least one boundary that is angle toward a vanishing point of a corresponding perspective and/or follows a perspective line of the corresponding perspective that extends towards its vanishing point.

As illustrated in FIG. 3, the cross-perspective spacing system 106 extracts snappable line segments from each object. In particular, the cross-perspective spacing system 106 extracts snappable line segments 310a from the first object 306a and extracts snappable line segments 310b from the second object 306b. As shown, the snappable line segments 310a for the first object 306a correspond to the line segments (i.e., boundaries) of the first perspective bounding box 308a. Similarly, the snappable line segments 310b for the second object 306b correspond to the line segments (i.e., boundaries) of the second perspective bounding box 308b. Accordingly, in one or more embodiments, the cross-perspective spacing system 106 extracts snappable line segments from an object by extracting the snappable line segments from the perspective bounding box associated with the object.

As further shown in FIG. 3, the cross-perspective spacing system 106 adds the snappable line segments 310a extracted from the first object 306a to a first snappable line segment set 312a. Further, the cross-perspective spacing system 106 adds the snappable line segments 310b extracted from the second object 306b to a second snappable line segment set 312b. In one or more embodiments, the first snappable line segment set 312a corresponds to the first perspective 304a, and the second snappable line segment set 312b corresponds to the second perspective 304b. Thus, in some embodiments, where the digital image 302 portrays multiple objects within the first perspective 304a and/or the second perspective 304b, the cross-perspective spacing system 106 adds all snappable line segments extracted from those objects to the corresponding snappable line segment set.

In one or more embodiments, the cross-perspective spacing system 106 uses one or more of the snappable line segments extracted from an object as a representative of that object. Indeed, as will be discussed in more detail below, the cross-perspective spacing system 106 sorts the snappable line segments extracted from objects within alignment bin maps generated for the perspectives of a digital image portraying the objects. Further, the cross-perspective spacing system 106 uses the sorted snappable line segments to select a snappable line segment for use in positioning another snappable line segment in another perspective so the snappable line segments are equidistant to a reference (e.g., a joining edge between perspectives). Thus, it should be understood that the following discussion can also be described in terms of the cross-perspective spacing system 106 sorting objects within alignment bin maps and selecting an object for use in positioning another object so that the objects are equidistant to a reference.

As previously mentioned, in some embodiments, the cross-perspective spacing system 106 generates one or more alignment bin maps for a digital image portraying multiple perspectives. In particular, in some instances, the cross-perspective spacing system 106 generates an alignment bin map for each perspective portrayed within a digital image. Further, the cross-perspective spacing system 106 uses each alignment bin map to sort the objects portrayed within the corresponding perspective (e.g., sort the extracted snappable line segments of each object). FIGS. 4A-4D illustrate the cross-perspective spacing system 106 generating alignment bin maps for a digital image portraying multiple perspectives and sorting objects within the alignment bins maps in accordance with one or more embodiments.

Figure 4A:
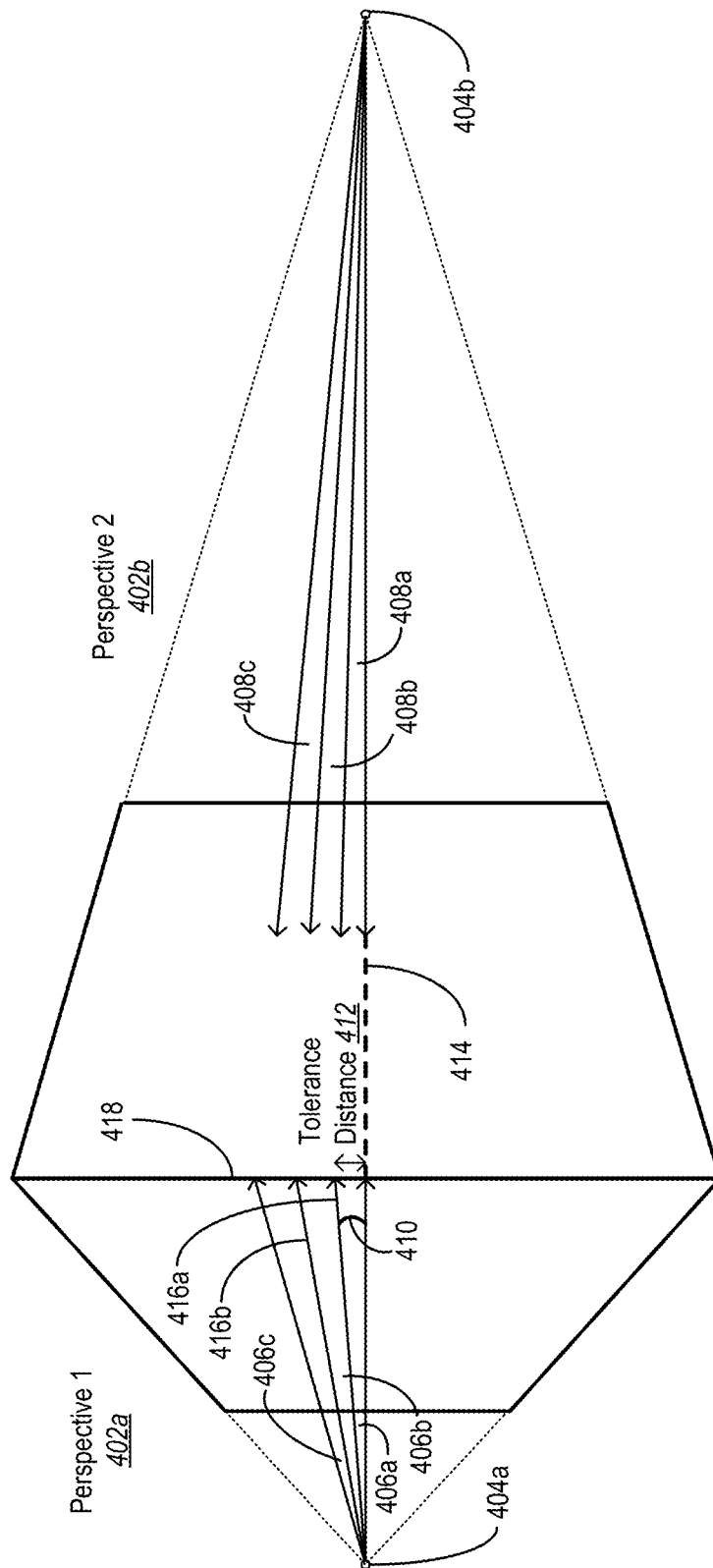
FIGS. 4A-4D illustrate the cross-perspective spacing system generating alignment bin maps for a digital image portraying multiple perspectives in accordance with one or more embodiments.

In particular, FIG. 4A illustrates a first perspective 402a and a second perspective 402b. In one or more embodiments, the first perspective 402a and the second perspective 402b are part of a digital image. For instance, in some cases, a digital image portrays a scene that includes the first perspective 402a and the second perspective 402b and further portrays one or more objects in the first perspective 402a and/or the second perspective 402b as part of the scene. As shown, the first perspective 402a is associated with a first vanishing point 404a. Similarly, the second perspective 402b is associated with a second vanishing point 404b.

As previously indicated, in one or more embodiments, the cross-perspective spacing system 106 generates an alignment bin map for each of the first perspective 402a and the second perspective 402b. In some embodiments, the cross-perspective spacing system 106 generates an alignment bin map for a perspective by dividing the perspective (e.g., dividing the portion of the digital image portrayed in that perspective) into a plurality of alignment bins. For example, as shown in FIG. 4A, the cross-perspective spacing system 106 divides the first perspective 402a into a first alignment bin 406a, a second alignment bin 406b, and a third alignment bin 406c. Similarly, the cross-perspective spacing system 106 divides the second perspective 402b into a fourth alignment bin 408a, a fifth alignment bin 408b, and a sixth alignment bin 408c. It should be understood, however, that the number of alignment bins shown in FIG. 4A for each perspective is exemplary. Indeed, the number of alignment bins determined for each perspective differs across various embodiments.

As shown in FIG. 4A, the cross-perspective spacing system 106 divides the first perspective 402a into the first alignment bin 406a, the second alignment bin 406b, and the third alignment bin 406c using a tolerance angle 410. Further, the cross-perspective spacing system 106 utilizes a horizontal reference line 414 in determining the plurality of alignment bins. As shown, the horizontal reference line 414 extends to the first vanishing point 404a associated with the first perspective 402a. Further, the horizontal reference line 414 extends through a center of the first perspective 402a, though the cross-perspective spacing system 106 utilizes horizontal reference lines with different positionings in various embodiments.

To illustrate, in one or more embodiments, the cross-perspective spacing system 106 determines the first alignment bin 406a for the first perspective 402a by determining a first horizontal line 416a that makes an angle with the horizontal reference line 414 that is equal to the tolerance angle 410. In other words, the cross-perspective spacing system 106 determines the first alignment bin 406a by determining a portion of the first perspective 402a (e.g., a portion of the digital image portrayed in the first perspective 402a) that is bounded by the first horizontal line 416a and the horizontal reference line 414 where the angle of the two lines is equal to the tolerance angle 410. As shown in FIG. 4A, the first horizontal line 416a extends to the first vanishing point 404a associated with the first perspective 402a. Thus, the first horizontal line 416a intersects the horizontal reference line 414 at the first vanishing point 404a.

Further, in one or more embodiments, the cross-perspective spacing system 106 determines the second alignment bin 406b for the first perspective 402a by determining a second horizontal line 416b that makes an angle with the first horizontal line 416a that is equal to the tolerance angle 410. In other words, the cross-perspective spacing system 106 determines the second alignment bin 406b by determining a portion of the first perspective 402a (e.g., a portion of the digital image portrayed in the first perspective 402a) that is bounded by the second horizontal line 416b and the first horizontal line 416a, where the angle created by the two lines is equal to the tolerance angle 410. As shown in FIG. 4A, the second horizontal line 416b also extends to the first vanishing point 404a. Thus, the second horizontal line 416b intersects the first horizontal line 416a (and the horizontal reference line 414) at the first vanishing point 404a.

Said differently, in some embodiments, the cross-perspective spacing system 106 determines the second alignment bin 406b by determining a second horizontal line (i.e., the second horizontal line 416b) that is at an angle to the horizontal reference line 414 that is equal to double the tolerance angle 410 and associates the portion of the first perspective 402a bounded by the second horizontal line 416b and the first horizontal line 416a with the second alignment bin 406b.

Thus, in some embodiments, the cross-perspective spacing system 106 determines each alignment bin to be bounded by horizontal lines that make an angle equal to the tolerance angle 410. Said differently, in some embodiments, the cross-perspective spacing system 106 determines each alignment bin to be bounded by horizontal lines that make an angle with the horizontal reference line 414 that is equal to a multiple of the tolerance angle 410.

Further, as indicated by FIG. 4A, each of the first alignment bin 406a and the second alignment bin 406b cover a range of angles. Indeed, as shown, the first alignment bin 406a covers a first range of angles that includes angles up to a first multiple of the tolerance angle 410. Further, the second alignment bin 406b covers a second range of angles that includes angles between a first multiple and a second multiple of the tolerance angle 410. Accordingly, in some cases, an object (e.g., a snappable line segment) making an angle with respect to the horizontal reference line 414 will be positioned within the alignment bin covering a range of angles that includes that angle.

In one or more embodiments, the cross-perspective spacing system 106 determines the tolerance angle 410 using a tolerance distance 412. For instance, in some embodiments, the cross-perspective spacing system 106 determines the tolerance distance 412 and then determines the tolerance angle 410 from the tolerance distance 412. In some instances, the cross-perspective spacing system 106 determines the tolerance distance 412 by receiving the tolerance distance 412 (or a related parameter) from a client device, such as a client device displaying a digital image that portrays the first perspective 402a and the second perspective 402b. In some implementations, the cross-perspective spacing system 106 determines the tolerance distance 412 from one or more user preferences associated with a client device. In some cases, the cross-perspective spacing system 106 utilizes a fixed value for the tolerance distance 412.

As indicated by FIG. 4A, in one or more embodiments, the cross-perspective spacing system 106 also utilizes the horizontal reference line 414 in determining the tolerance angle 410 from the tolerance distance 412. Further, as shown, the cross-perspective spacing system 106 utilizes a vertical reference line in determining the tolerance angle 410. In particular, the cross-perspective spacing system 106 uses the joining edge 418 between the first perspective 402a and the second perspective 402b as the vertical reference line for determining the tolerance angle 410, though other vertical reference lines are used in various embodiments.

In one or more embodiments, the cross-perspective spacing system 106 determines the tolerance angle 410 using the tolerance distance 412 by determining a horizontal line that is positioned at a vertical distance from the horizontal reference line 414 equal to the tolerance distance 412 at the vertical reference line (e.g., at the joining edge 418). In other words, the cross-perspective spacing system 106 determines a horizontal line that is positioned at a vertical distance from the horizontal reference line 414 equal to the tolerance distance 412 at the joining edge 418. In some embodiments, the cross-perspective spacing system 106 further determines the angle made by the horizontal line and the horizontal reference line 414 based on their intersection at the first vanishing point 404a and uses that angle as the tolerance angle 410. As an example, FIG. 4A illustrates the first horizontal line 416a at a vertical distance from the horizontal reference line 414 that is equal to the tolerance distance 412 at the joining edge 418. Further, FIG. 4A shows that the first horizontal line 416a and the horizontal reference line 414 make an angle that the cross-perspective spacing system 106 utilizes as the tolerance angle 410.

Thus, in one or more embodiments, the cross-perspective spacing system 106 determines a tolerance distance. The cross-perspective spacing system 106 further determines a tolerance angle using the tolerance distance as described above. Additionally, the cross-perspective spacing system 106 utilizes the tolerance angle to generate an alignment bin map for a perspective by dividing the perspective (e.g., a portion of a digital image portrayed in that perspective) into a plurality of alignment bins based on the determined tolerance angle.

In one or more embodiments, the cross-perspective spacing system 106 similarly generates an alignment bin map for the second perspective 402b. For instance, in some embodiments, the cross-perspective spacing system 106 uses the tolerance distance 412 and/or the tolerance angle 410 to generate the alignment bin map for the second perspective 402b (as well as the horizontal reference line 414 and the joining edge 418). Indeed, in some implementations, the cross-perspective spacing system 106 utilizes the same parameters for generating an alignment bin map for each perspective portrayed by a digital image. Thus, in some cases, the alignment bin maps generated for each perspective match in that an alignment bin for one perspective is similar to the corresponding alignment bin for the other perspective (e.g., similar in that they cover the same range of angles made with respect to the horizontal reference line). In some instances, however, the cross-perspective spacing system 106 utilizes one or more different parameters for generating each alignment bin map.

Further, while the above discusses generating alignment bin maps for perspectives that are oriented horizontally within a digital image (e.g., the vanishing points and perspective lines are in a horizontal orientation), the cross-perspective spacing system 106 similarly generates alignment bin maps for perspectives that are oriented vertically in various embodiments. Indeed, in such embodiments, the cross-perspective spacing system 106 adjusts the parameters as needed to divide each perspective into a plurality of alignment bins. For instance, in some cases, in a vertical orientation, the cross-perspective spacing system 106 determines a vertical reference line and determines alignment bins that are bounded by vertical lines that make an angle with the vertical reference line based on a tolerance angle.

Figure 4B:
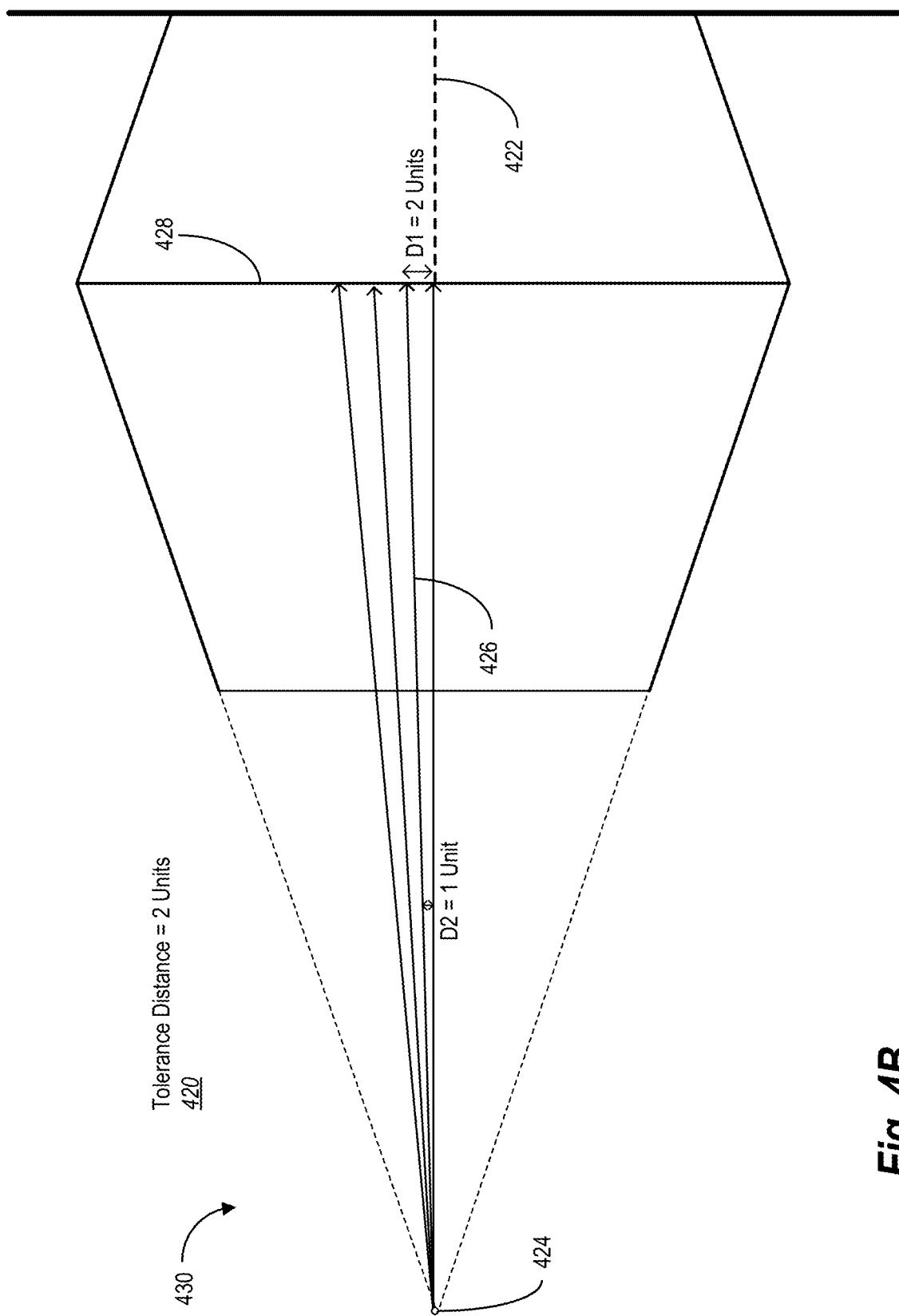

As mentioned, in one or more embodiments, the cross-perspective spacing system 106 utilizes a tolerance angle to generate an alignment bin map for a perspective. Further, in some cases, the cross-perspective spacing system 106 determines the tolerance angle using a tolerance distance. In some embodiments, the cross-perspective spacing system 106 uses a tolerance angle (rather than a tolerance distance) in generating an alignment bin map for a perspective to address the issue of diminishing tolerance. FIG. 4B illustrates the issue of diminishing tolerance addressed by the cross-perspective spacing system 106 in accordance with one or more embodiments.

As shown in FIG. 4B, the cross-perspective spacing system 106 determines a tolerance distance 420. FIG. 4B shows the cross-perspective spacing system 106 determining a tolerance distance 420 of two units for purposes of illustration. It should be understood that the cross-perspective spacing system 106 determines tolerance distances of various lengths in various embodiments.

FIG. 4B further shows horizontal reference line 422 and a first horizontal line 426, both of which extend to a vanishing point 424. As shown, at a joining edge 428 between perspectives, the horizontal reference line 422 and the first horizontal line 426 are at a vertical distance (labeled D1) that is equal to the tolerance distance 420. At a point much closer to the vanishing point 424, however, the horizontal reference line 422 and the first horizontal line 426 are at a vertical distance (labeled D2) that is equal to half the tolerance distance 420. Indeed, in accordance with the perspective 430, the horizontal reference line 422 and the first horizontal line 426 move closer to one another as they extend toward the vanishing point 424. Thus, the vertical distance between the horizontal reference line 422 and the first horizontal line 426 diminishes in the direction toward the vanishing point 424.

As will be explained below, in one or more embodiments, the cross-perspective spacing system 106 uses a tolerance angle (and the alignment bins determined using the tolerance angle) in positioning an object within one perspective to be equidistant from a reference (e.g., a joining edge between perspectives) relative to another object within another perspective. In some cases, because the distance between perspective lines diminishes towards the vanishing point, using a tolerance distance to determine a position for an object that results in equidistance between the object and another object risks performance issues. For instance, when an object is near the vanishing point of its perspective, multiple alignment bins may fall within the tolerance distance. Accordingly, multiple alignment bins may be associated with the object (e.g., associated with the same snappable line segment of the object), and the results can be inconsistent. In some instances, however, by utilizing a tolerance angle, the cross-perspective spacing system 106 ensures that the angle considered when determining a position for an object is consistent regardless of the distance to the vanishing point.

Figure 4C:
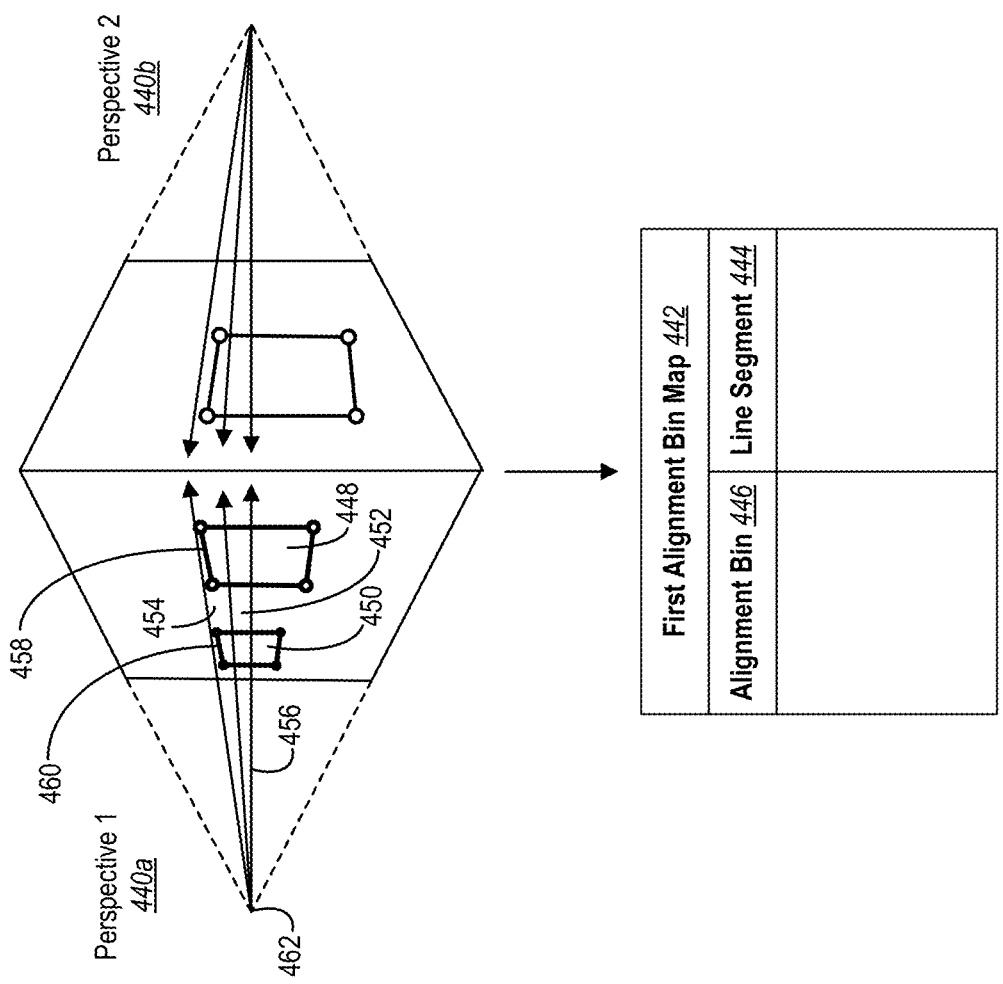

FIG. 4C illustrates the cross-perspective spacing system 106 sorting objects portrayed in a perspective using an alignment bin map generated for that perspective in accordance with one or more embodiments. In particular, FIG. 4C illustrates the cross-perspective spacing system 106 sorting snappable line segments extracted from the objects portrayed in the perspective using the alignment bin map generated for that perspective. Indeed, FIG. 4C illustrates a first perspective 440a and a second perspective 440b. The perspective lines of each perspective extend towards its vanishing point (e.g., the vanishing point 462 for the first perspective 440a). Further, FIG. 4C illustrates a first alignment bin map 442 generated for the first perspective 440a. As shown, the cross-perspective spacing system 106 utilizes the first alignment bin map 442 to map snappable line segments (represented by the line segment column 444) to alignment bins (represented by the alignment bin column 446). In one or more embodiments, a given alignment bin corresponds to one or more indices within the first alignment bin map 442.

FIG. 4C further illustrates a first object 448 and a second object 450 portrayed within the first perspective 440a. Further, FIG. 4C shows that the first object 448 and the second object 450 are positioned so that they partially reside in a first alignment bin 452 and a second alignment bin 454 determined for the first perspective 440a. FIG. 4C shows two alignment bins for simplification, but it should be understood that the cross-perspective spacing system 106 determines additional alignment bins (both above and below the horizontal reference line 456) in various embodiments.

As shown, a snappable line segment 458 associated with the first object 448 is positioned within the second alignment bin 454. In particular, an angle made by the snappable line segment 458 with respect to the horizontal reference line 456 falls within the range of angles associated with the second alignment bin 454. Accordingly, in one or more embodiments, upon determining that the snappable line segment 458 is positioned within the second alignment bin 454 (e.g., determining that the angle of the snappable line segment 458 falls within the range of angles associated with the second alignment bin 454), the cross-perspective spacing system 106 associates the snappable line segment 458 with the second alignment bin 454 within the first alignment bin map 442.

Similarly, as shown, a snappable line segment 460 associated with the second object 450 is positioned in the second alignment bin 454. In particular, an angle made by the snappable line segment 460 with respect to the horizontal reference line 456 (whether it is the same angle as the angle made by the snappable line segment 458 or a different angle) falls within the range of angles associated with the second alignment bin 454. Thus, in one or more embodiments, upon determining that the snappable line segment 460 is also positioned within the second alignment bin 454 (e.g., determining that the angle of the snappable line segment 460 also falls within the range of angles associated with the second alignment bin 454) the cross-perspective spacing system 106 also associates the snappable line segment 460 with the second alignment bin 454 within the first alignment bin map 442.

In one or more embodiments, the cross-perspective spacing system 106 associates each of the snappable line segment 458 and the snappable line segment 460 with the second alignment bin 454 by associating each snappable line segment with an index for the second alignment bin 454. To illustrate, in some embodiments, the cross-perspective spacing system 106 associates the second alignment bin 454 with a single index within the first alignment bin map 442 and assigns the index to each of the snappable line segment 458 and the snappable line segment 460. In some implementations, the cross-perspective spacing system 106 associates a single index with the second alignment bin 454 and creates sub-indices for the snappable line segment 458 and the snappable line segment 460. In some cases, the cross-perspective spacing system 106 associates the second alignment bin 454 with multiple (e.g., adjacent) indices within the first alignment bin map 442 and assigns each of the snappable line segment 458 and the snappable line segment 460 one of the indices.

In one or more embodiments, the cross-perspective spacing system 106 sorts all snappable line segments extracted from the first object 448 and the second object 450 as described above. Thus, in one or more embodiments, the cross-perspective spacing system 106 sorts snappable line segments associated with a perspective based on the alignment bin within which the snappable line segments are positioned. In some embodiments, the cross-perspective spacing system 106 sorts the horizontally oriented snappable line segments extracted from an object (but not the vertically oriented snappable line segments) as those snappable line segments are typically positioned in only one alignment bin. In some cases, however, the cross-perspective spacing system 106 sorts all snappable line segments extracted from an object.

In some cases, the cross-perspective spacing system 106 more particularly sorts snappable line segments associated with a perspective based on their angle with respect to a horizontal reference line. For instance, in some embodiments, the cross-perspective spacing system 106 associates snappable line segments making relatively greater angles with relatively higher index values. In some implementations, however, the cross-perspective spacing system 106 utilizes the angle of a snappable line segment to determine an integer value (e.g., an integer value representing the index) that is associated with an alignment bin. Either way, in some cases, the cross-perspective spacing system 106 utilizes the same approach for sorting snappable line segments associated with the first perspective 440a within the first alignment bin map 442 and sorting snappable line segments associated with the second perspective 440b within a corresponding alignment bin map.

Indeed, as previously mentioned, the cross-perspective spacing system 106 adds snappable line segments associated with a perspective to a snappable line segment set for that perspective. Accordingly, in one or more embodiments, the cross-perspective spacing system 106 iterates through the snappable line segment set for a perspective to sort the snappable line segments included therein using the corresponding alignment bin map.

Figure 4D:
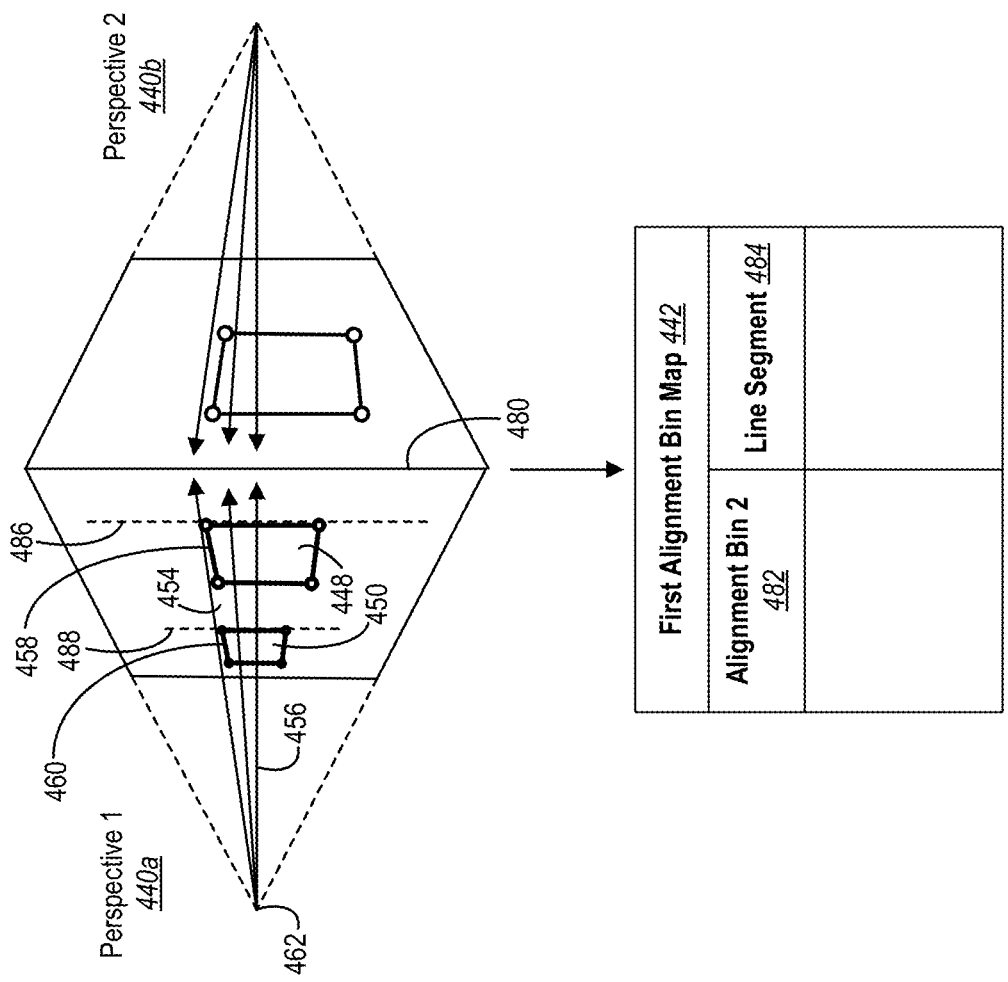

FIG. 4D illustrates the cross-perspective spacing system 106 further sorting the snappable line segments sorted within the first alignment bin map 442 based on distances of the snappable line segments to a reference in accordance with one or more embodiments. In particular, FIG. 4D illustrates the first alignment bin map 442 including an alignment bin column 482 corresponding to the second alignment bin 454 and a line segment column 484 corresponding to snappable line segments that have been associated with the second alignment bin 454. Though shown for illustration purposes, the alignment bin column 482 and the line segment column 484 indicate that the cross-perspective spacing system 106 sort snappable line segments within a given alignment bin in addition to sorting the snappable line segments within a given alignment bin map. In some cases, the alignment bin column 482 and the line segment column 484 represent sub-columns or portions of the alignment bin column 446 and the line segment column 444, respectively, shown in FIG. 4C.

Indeed, as discussed above with reference to FIG. 4C, the cross-perspective spacing system 106 sorts snappable line segments within an alignment bin map by associating each snappable line segment with an alignment bin from the alignment bin map. Thus, the cross-perspective spacing system 106 maps snappable line segments to alignment bins. As indicated by FIG. 4D, the cross-perspective spacing system 106 further sorts the snappable line segments within each alignment bin. For instance, in some cases, upon determining that an alignment bin is associated with multiple snappable line segments, the cross-perspective spacing system 106 sorts the multiple snappable line segments within the alignment bin. Thus, the cross-perspective spacing system 106 further maps snappable line segments to positions within an alignment bin.

As indicated above, in some implementations, the cross-perspective spacing system 106 associates an alignment bin with a single index within its alignment bin map. Thus, in some embodiments, the cross-perspective spacing system 106 sorts snappable line segments within an alignment bin by assigning each snappable line segment a sub-index for the single index. In some instances, however, the cross-perspective spacing system 106 associates an alignment bin with multiple (e.g., adjacent) indices within its alignment bin map. Accordingly, in some cases, the cross-perspective spacing system 106 sorts snappable line segments within an alignment bin by assigning each snappable line segment one of the indices associated with the alignment bin. In one or more embodiments, the cross-perspective spacing system 106 dynamically adjusts the indices of an alignment bin map as the snappable line segments are sorted.

As mentioned, and as indicated by FIG. 4D, the cross-perspective spacing system 106 sorts snappable line segments within an alignment bin based on their distance to a reference. In particular, FIG. 4D illustrates, the cross-perspective spacing system 106 using a joining edge 480 between the first perspective 440a and the second perspective 440b as the reference.

Indeed, the cross-perspective spacing system 106 sorts the snappable line segment 458 of the first object 448 and the snappable line segment 460 of the second object 450 based on their distances to the joining edge 480. As shown, the cross-perspective spacing system 106 determines a point of each snappable line segment that is closest to the joining edge 480. In particular, the cross-perspective spacing system 106 determines a point of the snappable line segment 458 closest to the joining edge 480 (represented by the dashed line 486) and a point of the snappable line segment 460 closest to the joining edge 480 (represented by the dashed line 488). As the first perspective 440a is positioned to the left of the joining edge 480, the cross-perspective spacing system 106 determines that the points closest to the joining edge 480 are the rightmost points of each snappable line segment. As such, in some cases, when operating in the second perspective 440b, which is to the right of the joining edge 480, the cross-perspective spacing system 106 determines that the points of snappable line segments closes to the joining edge 480 are the leftmost points of those snappable line segments.

Additionally, the cross-perspective spacing system 106 determines distances between the joining edge 480 and the points of the snappable line segment 458 and the snappable line segment 460 that are closest to the joining edge 480. The cross-perspective spacing system 106 further compares the distances to determine which snappable line segment is closest to the joining edge 480 and sorts the snappable line segments to indicate the snappable line segment that is closest to the joining edge 480 accordingly. Though FIG. 4D clearly shows that the snappable line segment 458 is closer to the joining edge 480 than the snappable line segment 460, sorting based on the closest point to the joining edge allows for consistent sorting even when the difference is not as clear (e.g., there is some overlap between the snappable line segments).

Thus, in one or more embodiments, after associating each snappable line segment with an alignment bin, the cross-perspective spacing system 106 iterates through each alignment bin to further sort the associated snappable line segments. The cross-perspective spacing system 106 determines the distances between the snappable line segments and a reference and then sorts the snappable line segments based on these distances.

In one or more embodiments, the cross-perspective spacing system 106 performs the sorting of the snappable line segments before an object is selected for movement within a perspective or insertion into a perspective (e.g., before a position for the object is to be determined). Indeed, in some cases, sorting the snappable line segments when an object is to be moved or inserted adds to the time complexity of determining a modified alignment for the object. Thus, by pre-sorting, the cross-perspective spacing system 106 reduces the time required to perform the process for determining the position for an object at the time the object is to be moved or inserted. In some implementations, whenever an object is moved or added, the cross-perspective spacing system 106 updates the sorting based on the movement or addition.

The algorithm presented below represents a characterization of how the cross-perspective spacing system 106 sorts snappable line segments associated with a perspective utilizing an alignment bin map for that perspective in accordance with some embodiments. In some cases, the cross-perspective spacing system 106 uses the algorithm in creating a cache by pre-sorting snappable line segments before an object is to be added or moved within a perspective.

---

Algorithm 1: Cache Creation

1. Alignment Bin Creation:
   Basic creation of Alignment Bin MAP Left and Right is as follows: tolerance angle A
   a. For each snappable segment l in S:
      i. Insert in MAP:
      ii. m = angle of l with respect to central reference line passing through the vanishing point
      iii. Q ← KEY(m)
         1. key ← (Angle/A)
      iv. Add l in bin number B[Q]
2. Sorting:
   For each segment in Alignment Bin Map Left
      a. r = Right position of segment in Left perspective
      b. rd = distance of r (right side) from vertical joining edge of 2 planes
      c. Sort the Map Left on the basis of this distance of right side of segment in left perspective
   For each segment in Map Right
      d. l = Left position of segment in Right perspective
      e. ld = distance of l (left side) from vertical joining edge of 2 planes Algorithm 1: Cache Creation f. Sort the Map Right on the basis of this distance of left side of segment in right perspective As indicated by algorithm 1, the cross-perspective spacing system 106 performs a first process by which snappable line segments in a snappable line segment set S for a perspective are associated with an alignment bin of an alignment bin map for that perspective. In particular, the cross-perspective spacing system 106 determines a key for a snappable line segment by dividing the angle m of the snappable line segment by tolerance angle A. The cross-perspective spacing system 106 uses the key as the number of the alignment bin that will be associated with the snappable line segment. As further indicated by algorithm 1, the cross-perspective spacing system 106 performs a second process by which the snappable line segments of each perspective are further sorted within the corresponding alignment bin maps based on their distance from the joining edge between perspective planes. In particular, as discussed above, the cross-perspective spacing system 106 further sorts snappable line segments within each associated alignment bin based on these distances.

The algorithm presented below represents another characterization of how the cross-perspective spacing system 106 performs the first process represented in algorithm 1 in accordance with one or more embodiments. In particular, the algorithm below represents another characterization of how the cross-perspective spacing system 106 associates snappable line segments with alignment bins of an alignment bin map.

perspective spacing system 106 sorts the snappable line segments within a set S based on their angles.

As further indicated by algorithm 2, in one or more embodiments, the cross-perspective spacing system 106 associates each alignment bin of an alignment bin map with an integer value. For instance, in some cases, the cross-perspective spacing system 106 associates the first alignment bin that is bordered by the horizontal reference line with a value of one, associates the second alignment bin that is adjacent to the first alignment bin with a value of two, and so forth. In some cases, the integer value associated with an alignment bin corresponds to the tolerance angle multiple associated with that alignment bin. For example, in some instances, the first alignment bin that is bordered by the horizontal reference line covers horizontal lines making an angle with the horizontal reference line up to a multiple of one of the tolerance angle. Likewise, the second alignment bin that is adjacent to the first alignment bin covers horizontal lines making an angle with the horizontal reference line up to a multiple of two of the tolerance angle. Thus, in some cases, the cross-perspective spacing system 106 associates each alignment bin with a number that represents the angles that are included.

As previously indicated, in some instances, the cross-perspective spacing system 106 determines alignment bins positioned both above and below the horizontal reference line. Accordingly, in some cases, the cross-perspective spac- Algorithm 2: Creation of Perspective Alignment Bin Require: tolerance angle A, list of snappable segments of perspective bounding boxes in S
procedure KEY(Angle)

$$key \leftarrow \frac{Angle}{A}$$

return integer part of key     ▷ Bin number based on tolerance angle
procedure INSERTION(l, B)
    m ← angle of l with respect to central line passing through the vanishing point
    Q ← KEY(m)
    Add l in B[Q]
procedure PERSPECTIVE ALIGNMENT BIN CREATION
    B is Alignment Bin Map with value being list of locations whose angle lies in that bin.
    for each $l_i$ in S do
        INSERTION($l_i$, B)
    for each angle Q in B do
        S ← B[Q]     ▷ B[Q] may be denoted as $B_Q$
        sort S based on angle of line segment from the vanishing point.
    return B As indicated by algorithm 2, in some cases, the cross-perspective spacing system 106 utilizes a first procedure to determine an integer value for a snappable line segment by dividing the angle of the snappable line segment by the tolerance angle A. In some cases, the cross-perspective spacing system 106 rounds up, rounds down, or rounds to the nearest integer to determine the integer value returned via the first procedure. The cross-perspective spacing system 106 further utilizes a second procedure in which the cross-perspective spacing system 106 inserts the snappable line segment into the alignment bin map B. Thus, the crossing system 106 determines two alignment bins that are bordered by the horizontal reference line (e.g., one above and one below). In some cases, the cross-perspective spacing system 106 associates both alignment bins with a value of one and separates snappable line segments based on whether they appear above or below the horizontal reference line. In some instances, the cross-perspective spacing system 106 associates alignment bins above the horizontal reference line with a positive integer value and alignment bins below the horizontal reference line with a negative integer value.

Figure 5A:
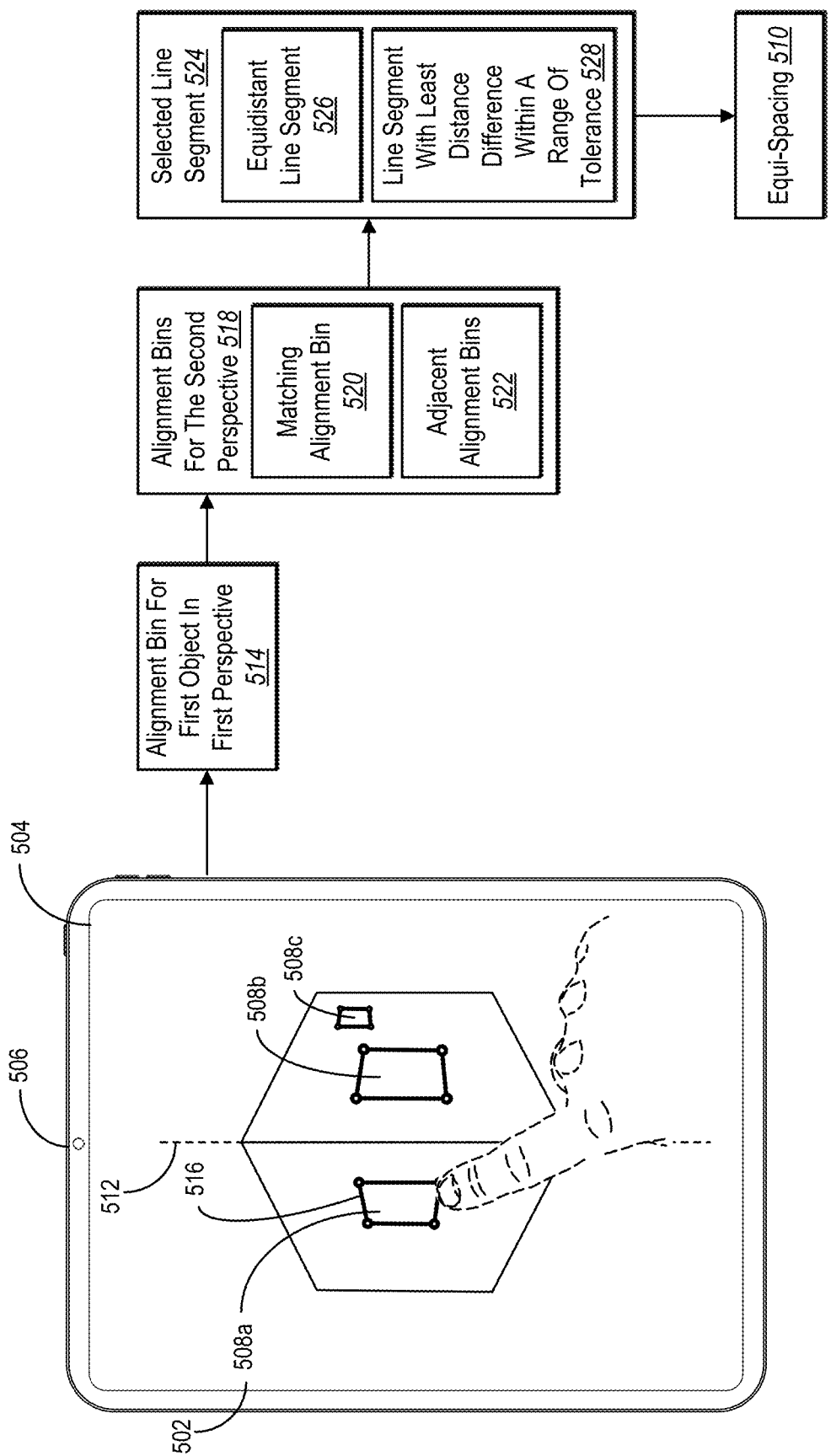
FIG. 5A illustrates the cross-perspective spacing system determining a position for an object that causes the object to be equidistant with another object in accordance with one or more embodiments.

As previously mentioned, in one or more embodiments, the cross-perspective spacing system 106 determines a position for an object moved within or added to a digital image. In particular, the cross-perspective spacing system 106 determines a position for an object portrayed within one perspective to make the object equidistant to a reference (e.g., a joining edge) relative to another object portrayed in another perspective of the digital image. FIG. 5A illustrates the cross-perspective spacing system 106 determining a position for an object that causes the object to be equidistant with another object in accordance with one or more embodiments.

As shown in FIG. 5A, the cross-perspective spacing system 106 provides a digital image 502 for display within a graphical user interface 504 of a client device 506. The digital image 502 portrays a first object 508a within a first perspective. The digital image 502 also portrays a second object 508b and a third object 508c within a second perspective. Additionally, as shown in FIG. 5A, the cross-perspective spacing system 106 detects the first object 508a being moved within (or added to) the first perspective. For instance, in some cases, the cross-perspective spacing system 106 detects one or more user interactions with the client device 506 (e.g., via the graphical user interface 504) for moving (or adding) the first object 508a.

As illustrated by FIG. 5A, in response to determining that the first object 508a is being moved within (or added to) the first perspective, the cross-perspective spacing system 106 determines an equi-spacing 510 for the first object 508a. In particular, the cross-perspective spacing system 106 determines a position for the first object 508a within the first perspective that causes the first object 508a to be equidistant to a joining edge 512 relative to either the second object 508b or the third object 508c. For example, in one or more embodiments, to determine the equi-spacing, the cross-perspective spacing system 106 selects an object from the second perspective upon which to base the position for the first object 508a and positions the first object 508a to have the same distance from the joining edge 512 as the selected object.

To illustrate, as shown in FIG. 5A, the cross-perspective spacing system 106 determines an alignment bin 514 associated with the first object 508a in the first perspective. In particular, the cross-perspective spacing system 106 determines the alignment bin that is associated with the first object 508a from the alignment bin map generated for the first perspective.

For instance, in some embodiments, the cross-perspective spacing system 106 identifies the snappable line segment 516 associated with the top portion of the perspective bounding box for the first object 508a. The cross-perspective spacing system 106 further determines an angle of the snappable line segment 516 with respect to a horizontal reference line for the digital image 502. Based on the angle, the cross-perspective spacing system 106 determines which alignment bin from the alignment bin map generated for the first perspective is associated with the first object 508a (e.g., associated with the snappable line segment 516). For example, the cross-perspective spacing system 106 identifies the alignment bin that covers a range of angles that includes the angle of the snappable line segment 516.

Though FIG. 5A suggests that the cross-perspective spacing system 106 determines one particular angle for the first object 508a, the cross-perspective spacing system 106 determines multiple angles or alternative angles in some implementations. For instance, in some cases, the cross-perspective spacing system 106 determines an angle for the first object 508a using the snappable line segment associated with the bottom portion of its perspective bounding box.

In some cases, the cross-perspective spacing system 106 determines that the angle for the first object 508a (e.g., the angle for the snappable line segment 516) changes as the first object 508a is moved within the first perspective. Indeed, the cross-perspective spacing system 106 determines that the perspective bounding box of the first object 508a changes in accordance with the first perspective as the first object 508a is moved (e.g., so that the horizontal lines point towards an associated vanishing point). Accordingly, in some embodiments, the cross-perspective spacing system 106 determines the angle of the first object 508a based on its movement within the first perspective. In some cases, the cross-perspective spacing system 106 tracks and updates the angle based on the movement.

As further shown in FIG. 5A, the cross-perspective spacing system 106 determines or selects one or more alignment bins 518 from the alignment bin map of the second perspective to use in positioning the first object 508a. For example, as shown the cross-perspective spacing system 106 determines an alignment bin 520 for the second perspective that corresponds to (e.g., matches) the alignment bin 514 associated with the first object 508a. For instance, in some cases, the cross-perspective spacing system 106 determines that the alignment bin 520 is associated with the same integer value as the alignment bin 514 associated with the first object 508a (e.g., the alignment bin 514 is the second alignment bin within its alignment bin map and the alignment bin 520 is the second alignment bin within its alignment bin map).

Additionally, as shown in FIG. 5A the cross-perspective spacing system 106 determines alignment bins 522 that are adjacent to the alignment bin 520. In particular, the cross-perspective spacing system 106 determines alignment bins that border the alignment bin 520 within the alignment bin map for the second perspective. For instance, in some cases, the cross-perspective spacing system 106 determines an alignment bin that immediately precedes the alignment bin 520 and determines another alignment bin that immediately follows the alignment bin 520 within the alignment bin map for the second perspective. In other words, as an example, where the alignment bin 520 is the second alignment bin within its alignment bin map, the cross-perspective spacing system 106 identifies the first alignment bin and the third alignment bin, both of which border the alignment bin 520.

As further shown in FIG. 5A, the cross-perspective spacing system 106 selects a snappable line segment 524 from the one or more alignment bins 518 selected for use in positioning the first object 508a. In particular, the cross-perspective spacing system 106 selects the snappable line segment 524 from the snappable line segments that were previously sorted into the one or more alignment bins 518. Indeed, upon selecting the one or more alignment bins 518 of the second perspective for use in positioning the first object 508a in the first perspective, the cross-perspective spacing system 106 identifies the snappable line segments that were previously sorted within those alignment bins. The cross-perspective spacing system 106 further selects a snappable line segment from those snappable line segments to use in positioning the first object 508a.

In some cases, the one or more alignment bins 518 contain one snappable line segment; thus, the cross-perspective spacing system 106 selects that snappable line segment (e.g., if it is within a range of tolerance) for use in positioning the first object 508a. In some implementations, the one or more alignment bins 518 contain multiple snappable line segments; accordingly, the cross-perspective spacing system 106 selects the snappable line segment 524 from the multiple snappable line segments.

In one or more embodiments, the cross-perspective spacing system 106 selects the snappable line segment 524 based on the distance to the joining edge 512. For example, the cross-perspective spacing system 106 selects the snappable line segment 524 based on the distance between the snappable line segment 516 of the first object 508*a* and the joining edge 512. The cross-perspective spacing system 106 further selects the snappable line segment 524 based on the distance between the snappable line segment 524 and the joining edge 512 (as well as the distance between any other snappable line segments sorted within the one or more alignment bins 518 and the joining edge 512).

For instance, as shown in FIG. 5A, the cross-perspective spacing system 106 selects, as the snappable line segment 524 an equidistant line segment 526 or a line segment 528 that has the least difference in distance from the snappable line segment 516 and is within a range of tolerance. To illustrate, in some cases, the cross-perspective spacing system 106 first determines whether any of the snappable line segments sorted within the one or more alignment bins 518 is equidistant to the joining edge 512 relative to the snappable line segment 516. Upon determining that there is an equidistant snappable line segment, the cross-perspective spacing system 106 selects that snappable line segment for use in positioning the first object 508*a* within the first perspective.

In some cases, the cross-perspective spacing system 106 determines that the one or more alignment bins 518 contain multiple equidistant snappable line segments. In such embodiments, the cross-perspective spacing system 106 selects the snappable line segment whose top vertical point is closest to the vertical point for the snappable line segment 524. Thus, in some cases, the cross-perspective spacing system 106 selects the snappable line segment that is closest in its vertical positioning to the snappable line segment 524.

In one or more embodiments, upon determining that there are no equidistant snappable line segments, the cross-perspective spacing system 106 determines whether there is a snappable line segment within a range of tolerance. Indeed, in some cases, the cross-perspective spacing system 106 establishes a range of tolerance that indicates a difference in distances to the joining edge 512 that is permitted in selecting a snappable line segment for use in positioning the first object 508*a*. In particular, in some embodiments, the cross-perspective spacing system 106 defines the range of tolerance as a difference in distances from the joining edge 512 between a snappable line segment and the snappable line segment 516. The cross-perspective spacing system 106 considers, for selection, those snappable line segments that are within the range of tolerance and excludes from consideration those snappable line segments falling outside the range of tolerance. As such, the cross-perspective spacing system 106 uses the range of tolerance to omit from consideration those snappable line segments that are positioned either too close to or too far away from the joining edge 512 relative to the distance between the joining edge 512 and the snappable line segment 516. In some embodiments, upon determining that no snappable line segment falls within the range of tolerance, the cross-perspective spacing system 106 does not select a snappable line segment for positioning the first object 508*a*.

In one or more embodiments, upon determining that multiple snappable line segments fall within the range of tolerance, the cross-perspective spacing system 106 selects the snappable line segment having the least difference in distance to the joining edge 512 relative to the snappable line segment 516. For instance, upon determining that multiple snappable line segments fall within the range of tolerance, the cross-perspective spacing system 106 determines the distance between each of those snappable line segments and the joining edge 512. The cross-perspective spacing system 106 further identifies the snappable line segment with a distance to the joining edge 512 that is closest to the distance of the snappable line segment 516 from the joining edge 512. In one or more embodiments, the cross-perspective spacing system 106 uses a binary search to identify the snappable line segment having the least difference in distance.

Thus, in one or more embodiments, the cross-perspective spacing system 106 selects the snappable line segment 524 to determine the equi-spacing 510 for the first object 508*a*. In particular, the cross-perspective spacing system 106 determines a position for the first object 508*a* within the first perspective that causes the first object 508*a* to be equidistant to the joining edge 512 relative to the snappable line segment 524 within the second perspective (e.g., the object associated with the snappable line segment 524). For instance, in some implementations, the cross-perspective spacing system 106 determines a position for the first object 508*a* that has a distance from the joining edge 512 that is equal to the distance of the snappable line segment 524 from the joining edge 512.

Figure 5B:
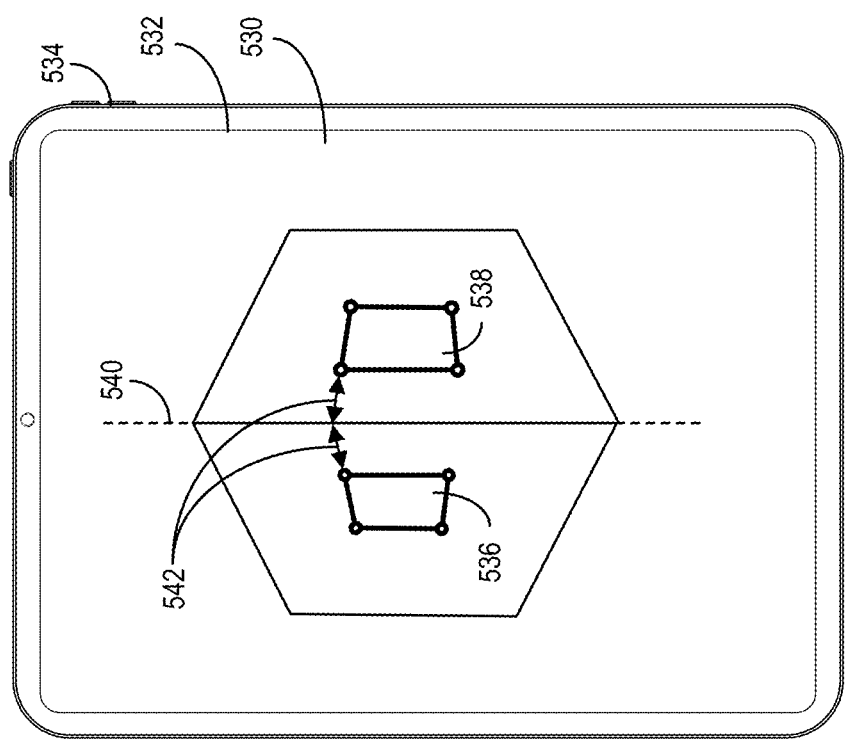
FIG. 5B illustrates, the cross-perspective spacing system positioning an object within a digital image to be equidistant with another object in another perspective in accordance with one or more embodiments.

As previously suggested, in some embodiments, the cross-perspective spacing system 106 modifies the digital image by positioning an object being moved within (or added to) a perspective based on a position determined for that object (e.g., a position causing the object to be equidistant with another object in another perspective). FIG. 5B illustrates, the cross-perspective spacing system 106 positioning an object within a digital image to be equidistant with another object in another perspective in accordance with one or more embodiments.

Indeed, as shown in FIG. 5B, the cross-perspective spacing system 106 provides a digital image 530 for display within a graphical user interface 532 of a client device 534. FIG. 5B shows that the digital image portrays a first object 536 within a first perspective and a second object 538 within a second perspective. In one or more embodiments, the first object 536 includes an object that has been moved within (or added to) the first perspective.

As shown in FIG. 5B, the cross-perspective spacing system 106 positions the first object 536 within the first perspective. In particular, the cross-perspective spacing system 106 positions the first object 536 to be equidistant to a joining edge 540 between the perspectives relative to the second object 538. Indeed, as indicated by the arrows 542, the first object 536 and the second object 538 are equidistant in that they have equal distance from the joining edge 540.

As further shown in FIG. 5B, the cross-perspective spacing system 106 generates and provides a perspective guide (e.g., one or more visual elements associated with the arrows 542) for display to indicate that the first object 536 is equidistant with the second object 538. Indeed, as shown, the cross-perspective spacing system 106 generates and provides the perspective guide to provide a visualization of the spacing for the first object 536.

In one or more embodiments, the cross-perspective spacing system 106 positions the first object 536 in response to user input. For instance, in some cases, the cross-perspective spacing system 106 generates and provides the perspective guide as a recommendation, receives user input for moving the first object 536 to the positioning indicated by the perspective guide, and moves the first object 536 accordingly. In some implementations, however, the cross-perspective spacing system 106 automatically positions the first object 536 in accordance with the determined position (e.g., by snapping the first object 536 to the positioning). In some cases, the cross-perspective spacing system 106 automatically positions the first object 536 and provides the perspective guide to indicate the positioning.

In one or more embodiments, the cross-perspective spacing system 106 automatically positions the first object 536 horizontally but not vertically. For instance, in some cases, as the horizontal position of the first object 536 dictates its equidistance with regard to the joining edge 540, the cross-perspective spacing system 106 positions the first object 536 by moving the first object 536 closer to or farther away from the joining edge 540 but does not move the first object 536 up or down. Accordingly, in some implementations, the cross-perspective spacing system 106 causes the first object 536 to have an equal distance from the joining edge 540 as the second object 538 even where the first object 536 and the second object 538 have different vertical positioning within the digital image.

In one or more embodiments, the cross-perspective spacing system 106 further adjusts the size of the first object 536 based on its horizontal distance to the vanishing point associated with the first perspective. For instance, in some cases, upon moving the first object 536 horizontally closer to the vanishing point, the cross-perspective spacing system 106 diminishes the size of the first object 536. In some instances, upon moving the first object 536 horizontally farther away from the vanishing point, the cross-perspective spacing system 106 increases the size of the first object 536. In some implementations, the cross-perspective spacing system 106 diminishes or increases the size of the first object 536 in proportion to the distance moved toward or away from the vanishing point, respectively.

The algorithm presented below represents a characterization of how the cross-perspective spacing system 106 positions an object within one perspective to be equidistant with another object in another perspective in accordance with some embodiments. In particular, the algorithm represents how the cross-perspective spacing system 106 selects a snappable line segment to use in positioning an object being moved within (or added to) a perspective and uses the snappable line segment to position the object in accordance with one or more embodiments.

---

Algorithm 3: Snapping and Hinting when Subject is in Transformation

---

1. Snappable Segment Extraction:
2. For moving segment S in P1:
   a. Find A = angle it makes with central line
   b. Index1 = Map index of Bin in M1 where this angle lies in M1
   c. Find Bin2= M2[Index1] i.e., use Index1 to find the alignment bin in M2
   d. SegmentsInToleranceZone += All the snappable segments in this bin Bin2, bin just before Bin2 and bin just after Bin2
   e. When moving object is in left perspective:
      1. Dm = Calculate the distance of the moving object's right position from the merging vertical edge of both the perspective planes.
      2. Using the binary search, find within SegmentsInToleranceZone, if any object's left segment lies on the right perspective map within a threshold distance difference (e.g., a range of tolerance).
      3. If any such object is found, show equi-spacing snapping hints for the two objects.
   f. When moving object is in right perspective:
      1. Dm = Calculate the distance of the moving object's left position from the merging vertical edge of both the perspective planes.
      2. Using the binary search, find within SegmentsInToleranceZone, if any object's right segment lies on the left perspective map within a threshold distance difference (e.g., range of tolerance)
      3. If any such object is found, show equi-spacing snapping hints for the two objects.

---

As indicated by algorithm 3, the cross-perspective spacing system 106 positions an object being moved within (or added to) a perspective based on a snappable line segment of the object. As the algorithm describes, the cross-perspective spacing system 106 determines an angle the snappable line segment makes with respect to a central line (or other horizontal reference line) and uses that angle to determine an alignment bin that is associated with that snappable line segment. The cross-perspective spacing system 106 further selects the corresponding alignment bin for the other perspective as well as the adjacent alignment bins. The cross-perspective spacing system 106 determines the distance between the moving snappable line segment and the joining edge and identifies snappable line segments from the selected alignment bins that are within a threshold distance difference. From those snappable line segments, the cross-perspective spacing system 106 selects one (e.g., one having an equal distance to the joining edge or one with the least distance difference) and provides the snapping hints (i.e., the perspective guide) accordingly. In some instances, the cross-perspective spacing system 106 further automatically positions the moving object (e.g., via a snapping operation).

To reiterate more clearly, the above describes sorting objects within alignment bin maps and positioning objects to be equidistant with other objects in terms of snappable line segments extracted from these objects. For instance, the cross-perspective spacing system 106 sorts objects within an alignment bin map (e.g., associates objects with alignment bins and sorts objects within the alignment bins) by sorting their snappable line segments within the alignment bin map. Further, the cross-perspective spacing system 106 determines an object to use in positioning another object so the objects are equidistant based on their snappable line segments. Indeed, the cross-perspective spacing system 106 determines the alignment bin associated with a snappable line segment being moved within (or added to) a perspective and selects a snappable line segment from another perspective to use in positioning the moving snappable line segment. In particular, the cross-perspective spacing system 106 selects the snappable line segment from the other perspective based on the distances of both snappable line segments from a joining edge between the perspectives. Thus, while the cross-perspective spacing system 106 uses the snappable line segments, the cross-perspective spacing system 106 ultimately positions objects associated with those snappable line segments to be equidistant with other objects.

As previously mentioned, in some embodiments, the cross-perspective spacing system 106 uses the top horizontal snappable line segment extracted from an object to sort the object within an alignment bin map and/or position the object (or another object) within its perspective. In some cases, the cross-perspective spacing system 106 uses the bottom horizontal snappable line segment. In some implementations, the cross-perspective spacing system 106 uses both and compares their resulting positions for the best results (e.g., determines which snappable line segment provides the best positioning for the corresponding object).

Thus, the cross-perspective spacing system 106 operates more flexibly when compared to conventional systems. In particular, the cross-perspective spacing system 106 flexibly offers features for positioning objects across different perspectives of a digital image so that those objects are equidistant to some reference, such as a joining edge between the perspectives. Indeed, by positioning an object to have a distance from the joining edge that equals the distance between the joining edge and another object in another perspective, the cross-perspective spacing system 106 flexibly provides object-based spacing for objects being moved within a digital image. Further, positioning approach offered by the cross-perspective spacing system 106 is free of the restrictions of grids and free of the errors of user input, allowing for more accurate spacing of objects that lead to a more natural, consistent appearance.

Further, by determining a positioning for an object within its perspective as described above, the cross-perspective spacing system 106 operates more efficiently than conventional systems. Indeed, the cross-perspective spacing system 106 implements a set of alignment bins that is smaller than the grids used by many conventional systems. Accordingly, the cross-perspective spacing system 106 searches its set of alignment bins to determine a position for an object much more quickly than possible under conventional systems. Indeed, in some cases, the cross-perspective spacing system 106 can search through its alignment bins two times as fast or faster when compared to the grid-based searching implemented by many conventional systems.

Figure 6:
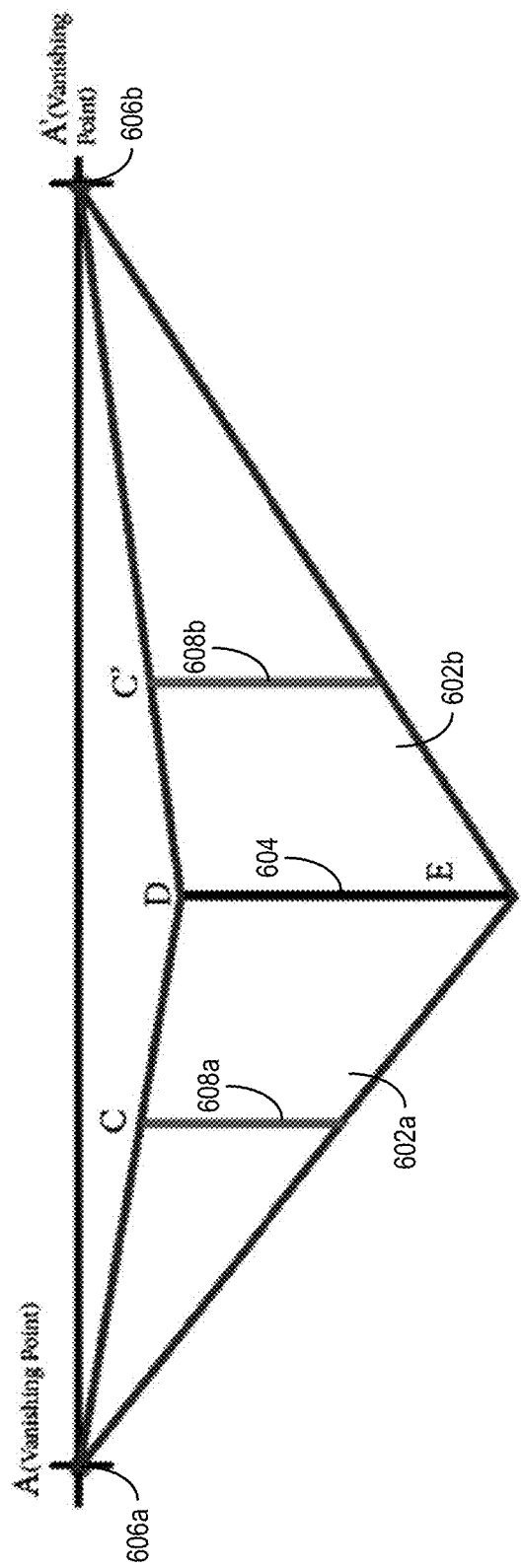
FIG. 6 illustrates the cross-perspective spacing system determining equidistance using perspective-based distances in accordance with one or more embodiments

As previously mentioned, in one or more embodiments, the cross-perspective spacing system 106 determines equidistance between objects using perspective-based distances between the objects and a reference. FIG. 6 illustrates the cross-perspective spacing system 106 determining equidistance using perspective-based distances in accordance with one or more embodiments.

FIG. 6 illustrates a first perspective 602a and a second perspective 602b that could be portrayed within a digital image. Additionally, FIG. 6 illustrates a joining edge 604, a first vanishing point 606a associated with the first perspective 602a, and a second vanishing point 606b associated with the second perspective 602b. FIG. 6 further illustrates a first vertical line 608a within the first perspective 602a and a second vertical line 608b within the second perspective 602b. In one or more embodiments, the first vertical line 608a and the second vertical line 608b correspond to horizontal positions within their respective perspective, such as potential horizontal positions for objects that may be portrayed by a digital image within those perspectives. Thus, in some embodiments, the first vertical line 608a and/or the second vertical line 608b correspond to positions considered by the cross-perspective spacing system 106 in positioning an object within one perspective to be equidistant to the joining edge 604 relative to another object in another perspective.

As mentioned above, in one or more embodiments, the cross-perspective spacing system 106 determines the distances of objects from a joining edge, such as the joining edge 604, in determining where to position one object to be equidistant to another object. In particular, the cross-perspective spacing system 106 determines a distance between an object being moved within (or added to) one perspective and additional distances of additional objects portrayed within another perspective. The cross-perspective spacing system 106 further compares the distances to select an additional object from the other perspective for use in positioning the moving object. As shown in FIG. 6, however, the first perspective 602a and the second perspective 602b are asymmetrically portrayed in that the joining edge 604 is positioned closer to the first vanishing point 606a than the second vanishing point 606b. Accordingly, the cross-perspective spacing system 106 determines and compares perspective-based distances for the objects under consideration.

To illustrate, in one or more embodiments, the first vertical line 608a and the second vertical line 608b are equidistant to the joining edge 604 based on their perspective-based distances. In some embodiments, the cross-perspective spacing system 106 uses the law of similarity to define the first vertical line 608a and the second vertical line 608b as equidistant to the joining edge 604 based on their perspective-based distances. In particular, the cross-perspective spacing system 106 defines multiple distance ratios based on the positions corresponding to the first vertical line 608a and the second vertical line 608b and equates the distance ratios to one another to define the first vertical line 608a and the second vertical line 608b as equidistant. For example, in some embodiments, the cross-perspective spacing system 106 equates the distance ratios shown below in defining the equidistance:

$$\frac{CD}{AD} = \frac{C'D}{A'D} \qquad (1)$$

As indicated in equation 1 with reference to FIG. 6, CD represents the distance from the first vertical line 608a to the joining edge 604 (e.g., a closest distance, such as one between the top ends of the first vertical line 608a to the joining edge 604), and AD represents the distance from the first vanishing point 606a to the joining edge 604 (e.g., a closest distance, as such as one between the first vanishing point 606a and a top end of the joining edge 604). Further, C'D represents the distance from the second vertical line 608b to the joining edge 604, and A'D represents the distance from the second vanishing point 606b to the joining edge 604. Accordingly, the distance C'D corresponds to the distance CD in that they both represent distances from their respective vertical lines to the joining edge 604, and the distance A'D corresponds to the distance AD in that they both represent distances from their respective vanishing points to the joining edge 604. Thus, as shown in FIG. 6 and as indicated by equation 1, the cross-perspective spacing system 106 determines that first vertical line 608a and the second vertical line 608b are equidistant based on the perspective-based distances if equation 1 is satisfied.

Further, in some embodiments, as indicated by equation 1, the cross-perspective spacing system 106 determines a perspective-based distance for a position within a perspective by determining a distance ratio for that position. In particular, the cross-perspective spacing system 106 determines a ratio of a first distance between the position and the joining edge to a second distance between the vanishing point of the perspective to the joining edge (though reference points other than the vanishing point and/or the joining edge are used in various embodiments).

Thus, in one or more embodiments, the cross-perspective spacing system 106 sorts objects within an alignment bin map generated for a perspective using their perspective-based distances (e.g., their distance ratios) that indicate their distance to the joining edge relative to their perspective). Further, upon moving an object within (or adding the object to) another perspective, the cross-perspective spacing system 106 determines the perspective-based distance of that object to the joining edge relative to the other perspective. The cross-perspective spacing system 106 uses the perspective-based distances to identify an object for use in positioning the moving object as described above. In particular, the cross-perspective spacing system 106 uses the perspective-based distances to select an object from the objects of the other perspective and positions the moving object to have the same perspective-based distance from the joining edge (e.g., via an automated snapping operation and/or using a perspective guide to recommend the position).

Figure 7:
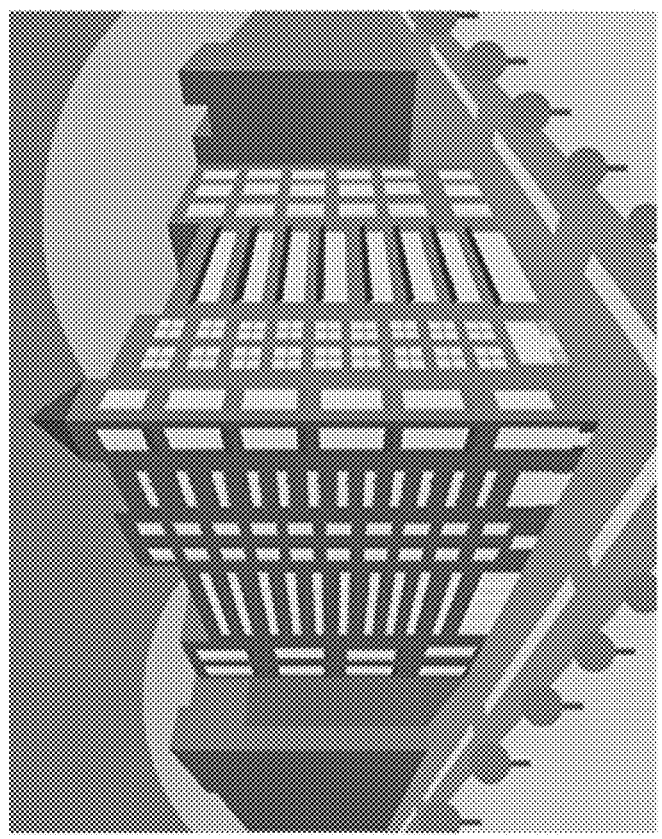
FIG. 7 illustrates a multi-perspective digital image operated on by the cross-perspective alignment system in accordance with some embodiments.

In one or more embodiments, the cross-perspective spacing system 106 modifies a digital image that portrays more than two perspectives to position an object within one of the perspectives to cause the object to be equidistant with another object of another perspective. FIG. 7 illustrates a digital image that portrays more than two perspectives in accordance with some embodiments. In particular, the digital image of FIG. 7 illustrates various building providing multiple faces that create a plurality of different perspectives in different perspective planes.

In one or more embodiments, the cross-perspective spacing system 106 modifies a digital image, such as the one shown in FIG. 7, by operating on pairs of perspectives. For instance, when moving an object within a first perspective, the cross-perspective spacing system 106 identifies a corresponding second perspective. The cross-perspective spacing system 106 further identifies an object in the corresponding second perspective and utilizes the positioning of the second object to determine a position for the object within the first perspective that causes the two objects to be equidistant to a joining edge between the perspectives. Thus, in some implementations, where a digital image includes three or more perspectives, the cross-perspective spacing system 106 positions objects across perspective pairs to be equidistant to their respective joining edge.

Figure 8:
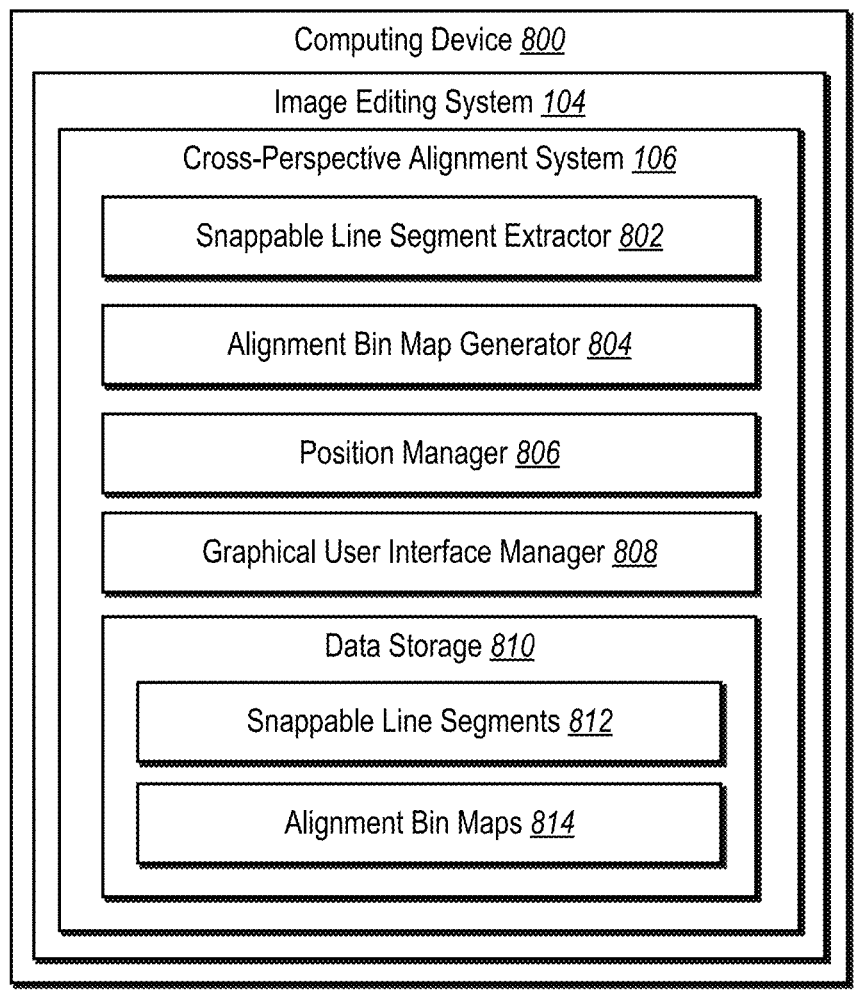
FIG. 8 illustrates an example schematic diagram of a cross-perspective alignment system in accordance with one or more embodiments.

Turning now to FIG. 8, additional detail will now be provided regarding various components and capabilities of the cross-perspective spacing system 106. In particular, FIG. 8 illustrates the cross-perspective spacing system 106 implemented by the computing device 800 (e.g., the server(s) 102 and/or one of the client devices 110a-110n discussed above with reference to FIG. 1). Additionally, the cross-perspective spacing system 106 is part of the image editing system 104. As shown in FIG. 8, the cross-perspective spacing system 106 includes, but is not limited to, a snappable line segment extractor 802, an alignment bin map generator 804, a position manager 806, a graphical user interface manager 808, and data storage 810 (which includes snappable line segments 812 and alignment bin maps 814).

As just mentioned, and as illustrated in FIG. 8, the cross-perspective spacing system 106 includes the snappable line segment extractor 802. In one or more embodiments, the snappable line segment extractor 802 extracts snappable line segments from objects portrayed in a digital image. In particular, in some embodiments, the snappable line segment extractor 802 extracts snappable line segments from the perspective bounding boxes of objects portrayed in a digital image. For instance, in some cases, the snappable line segment extractor 802 extracts each segment of a perspective bounding box as a snappable line segment.

Additionally, as shown in FIG. 8, the cross-perspective spacing system 106 includes the alignment bin map generator 804. In one or more embodiments, the alignment bin map generator 804 generates alignment bin maps for the perspectives portrayed by a digital image. In particular, in some cases, the alignment bin map generator 804 generates an alignment bin map for each perspective. In some implementations, the cross-perspective spacing system 106 generates an alignment bin map for a perspective by dividing the perspective (e.g., the portion of the digital image portrayed in the perspective) into a plurality of alignment bins based on a tolerance angle.

Further, as shown in FIG. 8, the cross-perspective spacing system 106 includes the position manager 806. In one or more embodiments, the position manager 806 determines a position for an object moved within (or added to) a perspective portrayed within a digital image so that the object is equidistant with another object portrayed in another perspective relative to a joining edge between perspectives. For instance, in some cases, the position manager 806 searches for another object portrayed in the other perspective (e.g., via a binary search) upon which to base the position of the moving object. The position manager 806 further determines the distance from the joining edge to position the moving object based on the distance from the joining edge of the other object in its perspective.

As shown in FIG. 8, the cross-perspective spacing system 106 also includes the graphical user interface manager 808. In one or more embodiments, the graphical user interface manager 808 manages the graphical user interface of a client device that is displaying a digital image. In some cases, the graphical user interface manager 808 provides visual elements for display based on the digital image and/or edits made to the digital image. For instance, in some embodiments, the graphical user interface manager 808 generates and provides a perspective guide that indicates a position for an object in one perspective that causes the object to be equidistant with another object portrayed in another perspective.

As shown in FIG. 8, the cross-perspective spacing system 106 also includes data storage 810. In particular, data storage 810 (implemented by one or more memory devices) includes snappable line segments 812 and alignment bin maps 814. In one or more embodiments, the snappable line segments 812 store the snappable line segments extracted from objects portrayed in a digital image. In some embodiments, the alignment bin maps 814 store the alignment bin maps generated for the perspectives portrayed within a digital image. In some cases, the alignment bin maps 814 also stores the indices or other indications of the sorting of snappable line segments within the alignment bin maps.

Each of the components 802-814 of the cross-perspective spacing system 106 can include software, hardware, or both. For example, the components 802-814 can include one or more instructions stored on a computer-readable storage medium and executable by processors of one or more computing devices, such as a client device or server device. When executed by the one or more processors, the computer-executable instructions of the cross-perspective spacing system 106 can cause the computing device(s) to perform the methods described herein. Alternatively, the components 802-814 can include hardware, such as a special-purpose processing device to perform a certain function or group of functions. Alternatively, the components 802-814 of the cross-perspective spacing system 106 can include a combination of computer-executable instructions and hardware.

Furthermore, the components 802-814 of the cross-perspective spacing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-814 of the cross-perspective spacing system 106 may be implemented as a stand-alone application, such as a desktop or mobile application. Furthermore, the components 802-814 of the cross-perspective spacing system 106 may be implemented as one or more web-based applications hosted on a remote server. Alternatively, or additionally, the components 802-814 of the cross-perspective spacing system 106 may be implemented in a suite of mobile device applications or "apps." For example, in one or more embodiments, the cross-perspective spacing system 106 can comprise or operate in connection with digital software applications such as ADOBE® PHOTOSHOP® or ADOBE® LIGHTROOM®. The foregoing are either registered trademarks or trademarks of Adobe Inc. in the United States and/or other countries.

Figure 9:
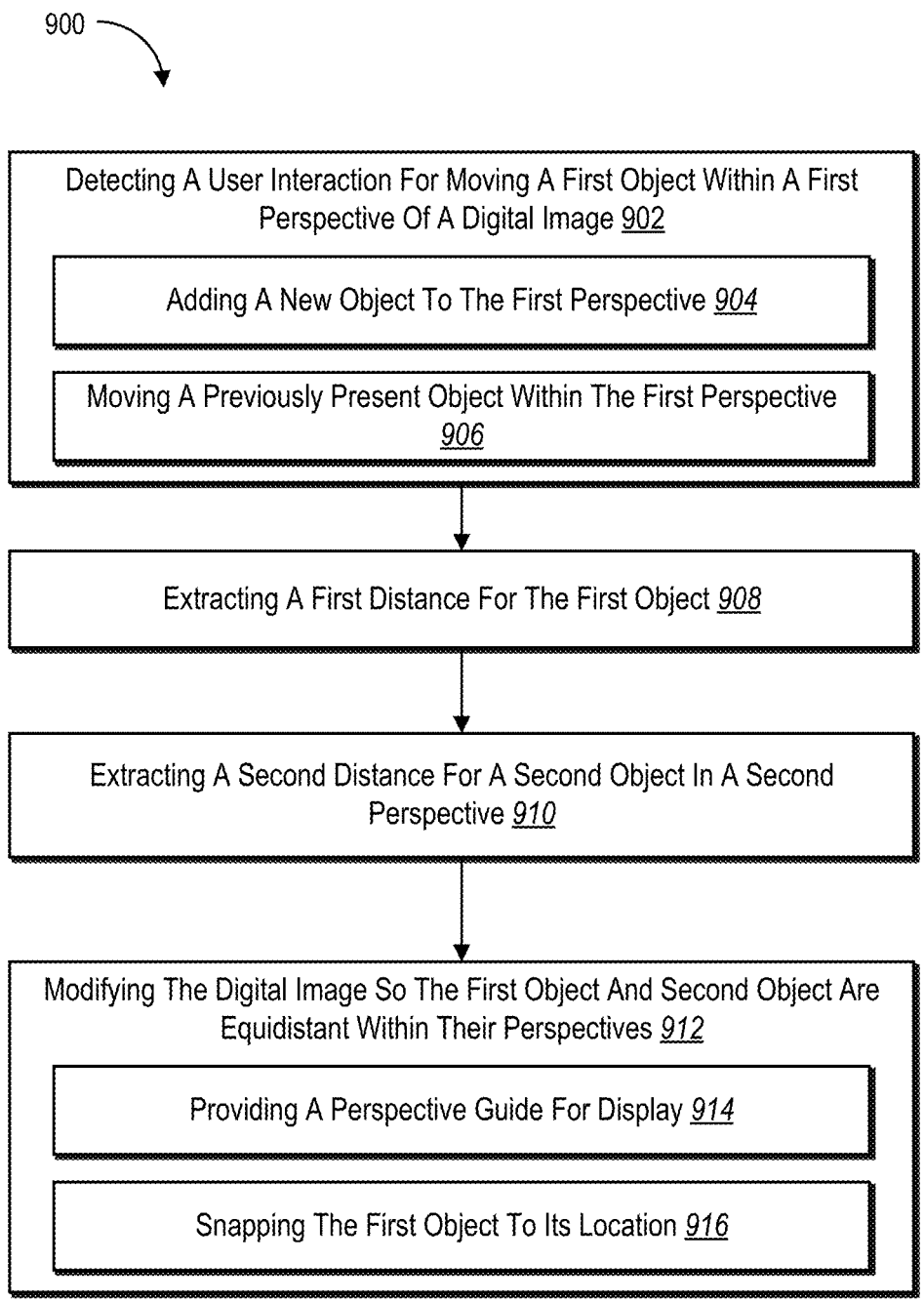
FIG. 9 illustrates a flowchart of a series of acts for aligning objects across different perspectives portrayed in a digital image in accordance with one or more embodiments.

FIGS. 1-8, the corresponding text, and the examples provide a number of different methods, systems, devices, and non-transitory computer-readable media of the cross-perspective spacing system 106. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for positioning objects across different perspectives portrayed in a digital image to be equidistant from a joining edge between perspectives in accordance with one or more embodiments. FIG. 9 illustrates acts according to one embodiment, alternative embodiments may omit, add to, reorder, and/or modify any of the acts shown in FIG. 9. In some implementations, the acts of FIG. 9 are performed as part of a computer-implemented method. Alternatively, a non-transitory computer-readable medium can store executable instructions thereon that, when executed by a processing device, cause the processing device to perform operations comprising the acts of FIG. 9. In some embodiments, a system performs the acts of FIG. 9. For example, in one or more embodiments, a system includes one or more memory devices comprising a digital image comprising a joining edge between a first perspective and a second perspective. The system further includes one or more processors configured to cause the system to perform operations comprising the acts of FIG. 9.

The series of acts 900 include an act 902 for detecting a user interaction for moving a first object within a first perspective of a digital image. Indeed, in one or more embodiments, the cross-perspective spacing system 106 operates on a digital image portraying multiple perspectives. Thus, in some embodiments, the act 902 involves detecting one or more user interactions for moving a first object within a first perspective of a digital image. As shown in FIG. 9, the act 902 includes a sub-act 904 for adding a new object to the first perspective. As shown, the act 902 also includes a sub-act 906 for moving a previously present object within the first perspective. Accordingly, in various embodiments, the first object includes an object being added or an object that is being moved but was already present in the first perspective.

Additionally, the series of acts 900 include an act 908 for extracting a first distance for the first object. For example, in one or more embodiments, the act 908 involves extracting a first distance between the first object within the first perspective of the digital image and a joining edge between the first perspective and a second perspective of the digital image.

The series of acts 900 also includes an act 910 for extracting a second distance for a second object in a second perspective. For instance, in some embodiments, the act 910 involves extracting a second distance between a second object within the second perspective of the digital image and the joining edge.

Further, the series of acts 900 includes an act 912 for modifying the digital image so the first object and second object are equidistant within their perspective. To illustrate, in some implementations, the act 912 involves modifying the digital image, based on the first distance and the second distance, by positioning the first object within the first perspective to be equidistant to the joining edge relative to the second object within the second perspective.

As shown in FIG. 9, the act 912 includes a sub-act 914 for providing a perspective guide for display. In particular, in one or more embodiments, the cross-perspective spacing system 106 generates, for display within a graphical user interface of a client device displaying the digital image, a perspective guide indicating that the first object is equidistant to the joining edge relative to the second object within the second perspective. As further shown in FIG. 9, the act 912 also includes a sub-act 916 for snapping the first object to its location. Indeed, in some implementations, the cross-perspective spacing system 106 positions the first object within the first perspective to be equidistant to the joining edge by snapping the first object to a location within the first perspective that is equidistant to the joining edge relative to the second object within the second perspective.

In one or more embodiments, the series of acts 900 further includes acts for generating and implementing alignment bin maps for the digital image. For instance, in some cases, the acts include generating a first alignment bin map comprising a first set of alignment bins for the first perspective of the digital image and a second alignment bin map comprising a second set of alignment bins for the second perspective of the digital image; and sorting a plurality of objects portrayed in the second perspective within the second set of alignment bins based on distances between the plurality of objects and the joining edge, the plurality of objects comprising the second object. In some embodiments, the cross-perspective spacing system 106 sorts the plurality of objects portrayed in the second perspective within the second set of alignment bins further by associating each object with an alignment bin from the second set of alignment bins based on an angle of each object with respect to a horizontal reference line for the second perspective.

In one or more embodiments, the cross-perspective spacing system 106 further selects the second object from the plurality of objects portrayed in the second perspective for use in positioning the first object within the first perspective based on the second distance between the second object and the joining edge. In some instances, selecting the second object from the plurality of objects based on the second distance between the second object and the joining edge comprises: determining a first alignment bin from the first set of alignment bins associated with the first object based on a position of the first object within the first perspective; determining one or more second alignment bins from the second set of alignment bins that correspond to the first alignment bin, the one or more second alignment bins comprising a subset of objects from the plurality of objects; and selecting the second object from the subset of objects based on determining that the second distance between the second object and the joining edge is nearest to being equidistant relative to the first object within the first perspective compared to distances between other objects from the subset of objects and the joining edge. In some embodiments, selecting the second object from the plurality of objects based on the second distance between the second object and the joining edge comprises selecting the second object based on determining that the second distance between the second object and the joining edge is within a range of tolerance.

In some embodiments, the series of acts 900 also includes acts for using perspective-based distances in determining positioning the first object within the first perspective to be equidistant with the second object. For example, in some instances, the acts include determining a first distance ratio using the first distance between the first object and the joining edge and a third distance between the joining edge and a first vanishing point associated with the first perspective; and determining a second distance ratio using the second distance between the second object and the joining edge and a fourth distance between the joining edge and a second vanishing point associated with the second perspective. As such, in some cases, modifying the digital image based on the first distance and the second distance comprises modifying the digital image based on the first distance ratio and the second distance ratio.

To provide an illustration, in one or more embodiments, the cross-perspective spacing system 106 generates a first alignment bin map for the first perspective of the digital image and a second alignment bin map for the second perspective of the digital image; sorts objects portrayed in the first perspective within the first alignment bin map based on positions of the objects within the first perspective; determines, in response to a user interaction for moving an additional object within the second perspective, a subset of the objects sorted within the first alignment bin map based on a position of the additional object within the second perspective; selects an object from the subset of the objects to use in positioning the additional object within the second perspective based on a first distance between the object and the joining edge and a second distance between the additional object and the joining edge; and modifies the digital image to position the additional object in the second perspective to be equidistant to the joining edge relative to the object within the first perspective.

In one or more embodiments, the cross-perspective spacing system 106 generates the first alignment bin map and the second alignment bin map by: determining a tolerance angle with respect to a horizontal reference line; dividing, using the tolerance angle, the first perspective into a first plurality of alignment bins for the first alignment bin map; and dividing, using the tolerance angle, the second perspective into a second plurality of alignment bins for the second alignment bin map. In some cases, dividing, using the tolerance angle, the first perspective into the first plurality of alignment bins comprises: generating a first alignment bin bounded by the horizontal reference line and a first horizontal line making a first angle with the horizontal reference line that is equal to the tolerance angle; and generating a second alignment bin bounded by the first horizontal line and a second horizontal line making a second angle with the first horizontal line that is equal to the tolerance angle. In some instances, determining the tolerance angle with respect to the horizontal reference line comprises: determining a tolerance distance; determining a horizontal line that extends to a vanishing point of the first perspective or the second perspective and is positioned away from the horizontal reference line at a distance that is equal to the tolerance distance at the joining edge between the first perspective and the second perspective; and determining an angle between the horizontal line and the horizontal reference line.

In one or more embodiments, the cross-perspective spacing system 106 sorts the objects portrayed in the first perspective within the first alignment bin map based on the positions of the objects within the first perspective by: associating each object from the objects with an alignment bin of the first alignment bin map based on an angle of each object with respect to a horizontal reference line associated with the first perspective; determining at least one alignment bin of the first alignment bin map that is associated with multiple objects; and sorting the multiple objects associated with the at least one alignment bin based on distances between the multiple objects and the joining edge. In some embodiments, the cross-perspective spacing system 106 to selects the object to use in positioning the additional object within the second perspective based on the first distance between the object and the joining edge and the second distance between the additional object and the joining edge by selecting the object based on determining that the first distance between the object and the joining edge is equal to the second distance between the additional object and the joining edge.

In some implementations, the cross-perspective spacing system 106 determines the subset of the objects sorted within the first alignment bin map based on the position of the additional object within the second perspective by: determining an alignment bin from the second alignment bin map that is associated with the additional object based on the position of the additional object within the second perspective; determining an additional alignment bin from the first alignment bin map that corresponds to the alignment bin from the second alignment bin map; determining a first adjacent alignment bin and a second adjacent alignment bin that border the additional alignment bin within the first alignment bin map; and selecting one or more objects associated with the additional alignment bin, the first adjacent alignment bin, and the second adjacent alignment bin.

To provide another illustration, in one or more embodiments, the cross-perspective spacing system 106 determines, in response to one or more user interactions for moving an object within a first perspective of a digital image, a distance between the object and a joining edge between the first perspective and a second perspective of the digital image; determines additional distances between additional objects within the second perspective and the joining edge; selects an additional object from the additional objects to use in positioning the object within the first perspective based on the distance and the additional distances; and modifies the digital image by positioning the object within the first perspective to be equidistant to the joining edge relative to the additional object within the second perspective.

In one or more embodiments, determining the distance between the object and the joining edge comprises determining a perspective-based distance between the object and the joining edge relative to the first perspective; and determining the additional distances between the additional objects within the second perspective and the joining edge comprises determining additional perspective-based distances between the additional objects and the joining edge relative to the second perspective. In some embodiments, selecting the additional object from the additional objects based on the distance and the additional distances comprises: comparing the perspective-based distance to the additional perspective-based distances to determine an additional perspective-based distance having a least difference from the perspective-based distance; and determining that the additional object is associated with the additional perspective-based distance having the least difference from the perspective-based distance. Further, in some cases, modifying the digital image by positioning the object within the first perspective to be equidistant to the joining edge relative to the additional object within the second perspective comprises modifying the digital image by positioning the object within the first perspective so that the perspective-based distance between the object and the joining edge is equal to the additional perspective-based distance between the additional object and the joining edge.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
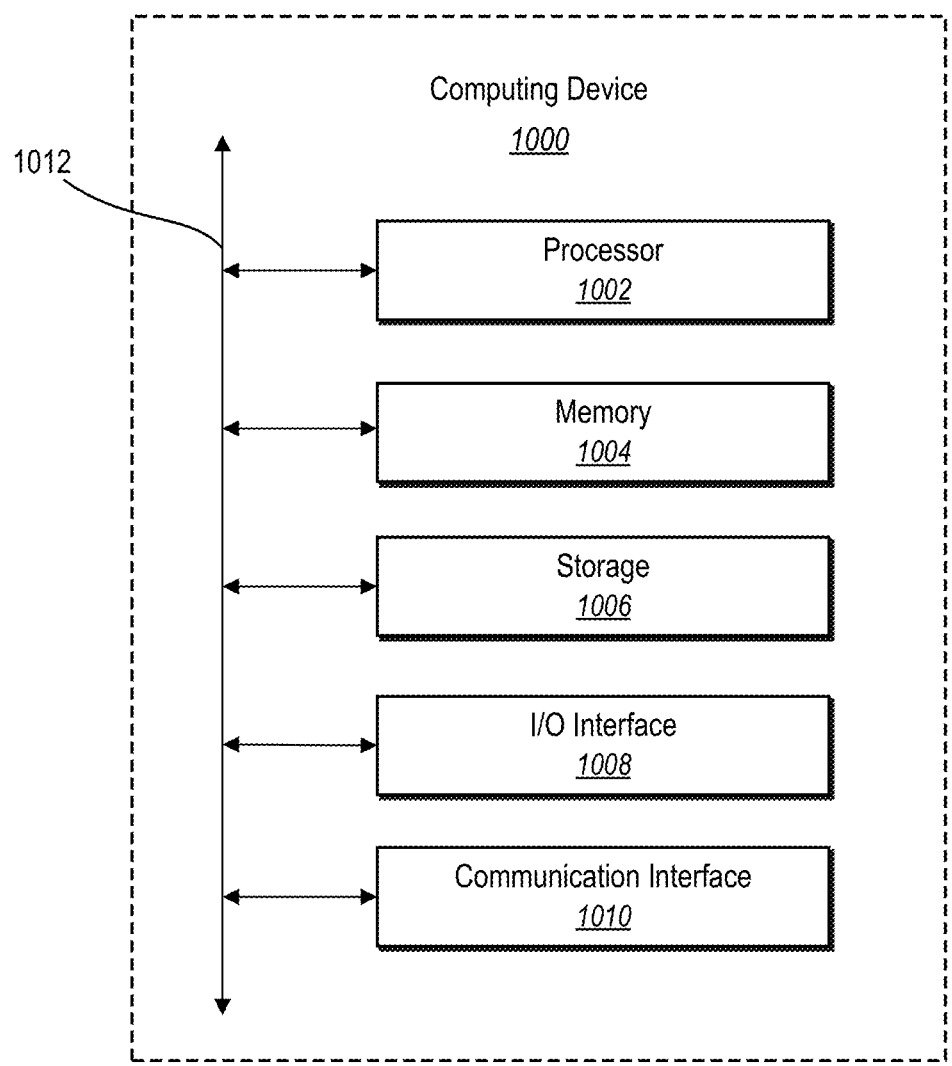
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102 and/or the client devices 110a-110n). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   detecting one or more user interactions for moving a first object within a first perspective of a digital image;
   extracting a first distance between the first object within the first perspective of the digital image and a joining edge between the first perspective and a second perspective of the digital image;
   extracting a second distance between a second object within the second perspective of the digital image and the joining edge; and
   modifying the digital image, based on the first distance and the second distance, by positioning the first object within the first perspective to be equidistant to the joining edge relative to the second object within the second perspective.

2. The computer-implemented method of claim 1, further comprising:
   generating a first alignment bin map comprising a first set of alignment bins for the first perspective of the digital image and a second alignment bin map comprising a second set of alignment bins for the second perspective of the digital image; and
   sorting a plurality of objects portrayed in the second perspective within the second set of alignment bins based on distances between the plurality of objects and the joining edge, the plurality of objects comprising the second object.

3. The computer-implemented method of claim 2, further comprising sorting the plurality of objects portrayed in the second perspective within the second set of alignment bins further by associating each object with an alignment bin from the second set of alignment bins based on an angle of each object with respect to a horizontal reference line for the second perspective.

4. The computer-implemented method of claim 2, further comprising selecting the second object from the plurality of objects portrayed in the second perspective for use in positioning the first object within the first perspective based on the second distance between the second object and the joining edge.

5. The computer-implemented method of claim 4, wherein selecting the second object from the plurality of objects based on the second distance between the second object and the joining edge comprises:
   determining a first alignment bin from the first set of alignment bins associated with the first object based on a position of the first object within the first perspective;
   determining one or more second alignment bins from the second set of alignment bins that correspond to the first alignment bin, the one or more second alignment bins comprising a subset of objects from the plurality of objects; and
   selecting the second object from the subset of objects based on determining that the second distance between the second object and the joining edge is nearest to being equidistant relative to the first object within the first perspective compared to distances between other objects from the subset of objects and the joining edge.

6. The computer-implemented method of claim 5, wherein selecting the second object from the plurality of objects based on the second distance between the second object and the joining edge comprises selecting the second object based on determining that the second distance between the second object and the joining edge is within a range of tolerance.

7. The computer-implemented method of claim 1, further comprising:
   determining a first distance ratio using the first distance between the first object and the joining edge and a third distance between the joining edge and a first vanishing point associated with the first perspective; and
   determining a second distance ratio using the second distance between the second object and the joining edge and a fourth distance between the joining edge and a second vanishing point associated with the second perspective,
   wherein modifying the digital image based on the first distance and the second distance comprises modifying the digital image based on the first distance ratio and the second distance ratio.

8. The computer-implemented method of claim 1, further comprising generating, for display within a graphical user interface of a client device displaying the digital image, a perspective guide indicating that the first object is equidistant to the joining edge relative to the second object within the second perspective.

9. The computer-implemented method of claim 1, wherein positioning the first object within the first perspective to be equidistant to the joining edge comprises snapping the first object to a location within the first perspective that is equidistant to the joining edge relative to the second object within the second perspective.

10. A system comprising:
    one or more memory devices comprising a digital image comprising a joining edge between a first perspective and a second perspective; and
    one or more processors configured to cause the system to:
      generate a first alignment bin map for the first perspective of the digital image and a second alignment bin map for the second perspective of the digital image;
      sort objects portrayed in the first perspective within the first alignment bin map based on positions of the objects within the first perspective;
      determine, in response to a user interaction for moving an additional object within the second perspective, a subset of the objects sorted within the first alignment bin map based on a position of the additional object within the second perspective;
      select an object from the subset of the objects to use in positioning the additional object within the second perspective based on a first distance between the object and the joining edge and a second distance between the additional object and the joining edge; and
      modify the digital image to position the additional object in the second perspective to be equidistant to the joining edge relative to the object within the first perspective.

11. The system of claim 10, wherein the one or more processors are configured to cause the system to generate the first alignment bin map and the second alignment bin map by:
    determining a tolerance angle with respect to a horizontal reference line;
    dividing, using the tolerance angle, the first perspective into a first plurality of alignment bins for the first alignment bin map; and
    dividing, using the tolerance angle, the second perspective into a second plurality of alignment bins for the second alignment bin map.

12. The system of claim 11, wherein dividing, using the tolerance angle, the first perspective into the first plurality of alignment bins comprises:

generating a first alignment bin bounded by the horizontal reference line and a first horizontal line making a first angle with the horizontal reference line that is equal to the tolerance angle; and generating a second alignment bin bounded by the first horizontal line and a second horizontal line making a second angle with the first horizontal line that is equal to the tolerance angle.

13. The system of claim 11, wherein determining the tolerance angle with respect to the horizontal reference line comprises:

determining a tolerance distance;

determining a horizontal line that extends to a vanishing point of the first perspective or the second perspective and is positioned away from the horizontal reference line at a distance that is equal to the tolerance distance at the joining edge between the first perspective and the second perspective; and determining an angle between the horizontal line and the horizontal reference line.

14. The system of claim 10, wherein the one or more processors are configured to cause the system to sort the objects portrayed in the first perspective within the first alignment bin map based on the positions of the objects within the first perspective by:

associating each object from the objects with an alignment bin of the first alignment bin map based on an angle of each object with respect to a horizontal reference line associated with the first perspective;

determining at least one alignment bin of the first alignment bin map that is associated with multiple objects; and sorting the multiple objects associated with the at least one alignment bin based on distances between the multiple objects and the joining edge.

15. The system of claim 10, wherein the one or more processors are configured to cause the system to select the object to use in positioning the additional object within the second perspective based on the first distance between the object and the joining edge and the second distance between the additional object and the joining edge by selecting the object based on determining that the first distance between the object and the joining edge is equal to the second distance between the additional object and the joining edge.

16. The system of claim 10, wherein the one or more processors are configured to cause the system to determine the subset of the objects sorted within the first alignment bin map based on the position of the additional object within the second perspective by:

determining an alignment bin from the second alignment bin map that is associated with the additional object based on the position of the additional object within the second perspective;

determining an additional alignment bin from the first alignment bin map that corresponds to the alignment bin from the second alignment bin map;

determining a first adjacent alignment bin and a second adjacent alignment bin that border the additional alignment bin within the first alignment bin map; and selecting one or more objects associated with the additional alignment bin, the first adjacent alignment bin, and the second adjacent alignment bin.

17. A non-transitory computer-readable medium storing executable instructions that, when executed by a processing device, cause the processing device to perform operations comprising:

determining, in response to one or more user interactions for moving an object within a first perspective of a digital image, a distance between the object and a joining edge between the first perspective and a second perspective of the digital image;

determining additional distances between additional objects within the second perspective and the joining edge;

selecting an additional object from the additional objects to use in positioning the object within the first perspective based on the distance and the additional distances; and modifying the digital image by positioning the object within the first perspective to be equidistant to the joining edge relative to the additional object within the second perspective.

18. The non-transitory computer-readable medium of claim 17, wherein:

determining the distance between the object and the joining edge comprises determining a perspective-based distance between the object and the joining edge relative to the first perspective; and determining the additional distances between the additional objects within the second perspective and the joining edge comprises determining additional perspective-based distances between the additional objects and the joining edge relative to the second perspective.

19. The non-transitory computer-readable medium of claim 18, wherein selecting the additional object from the additional objects based on the distance and the additional distances comprises:

comparing the perspective-based distance to the additional perspective-based distances to determine an additional perspective-based distance having a least difference from the perspective-based distance; and determining that the additional object is associated with the additional perspective-based distance having the least difference from the perspective-based distance.

20. The non-transitory computer-readable medium of claim 19, wherein modifying the digital image by positioning the object within the first perspective to be equidistant to the joining edge relative to the additional object within the second perspective comprises modifying the digital image by positioning the object within the first perspective so that the perspective-based distance between the object and the joining edge is equal to the additional perspective-based distance between the additional object and the joining edge.

* * * * *